(12) United States Patent
Huppi et al.

(10) Patent No.: US 8,727,611 B2
(45) Date of Patent: May 20, 2014

(54) SYSTEM AND METHOD FOR INTEGRATING SENSORS IN THERMOSTATS

(75) Inventors: Brian Huppi, San Francisco, CA (US); John Benjamin Filson, Mountain View, CA (US); Fred Bould, Menlo Park, CA (US); David Sloo, Menlo Park, CA (US); Matthew Lee Rogers, Los Gatos, CA (US); Anthony Michael Fadell, Portola Valley, CA (US)

(73) Assignee: Nest Labs, Inc., Palo Alto, CA (US)

( * ) Notice: Subject to any disclaimer, the term of this patent is extended or adjusted under 35 U.S.C. 154(b) by 84 days.

(21) Appl. No.: 13/199,108

(22) Filed: Aug. 17, 2011

(65) Prior Publication Data
US 2012/0128025 A1   May 24, 2012

Related U.S. Application Data

(63) Continuation-in-part of application No. 13/033,573, filed on Feb. 23, 2011.

(60) Provisional application No. 61/415,771, filed on Nov. 19, 2010, provisional application No. 61/429,093, filed on Dec. 31, 2010.

(51) Int. Cl.
*G01J 5/00* (2006.01)

(52) U.S. Cl.
USPC ............... 374/121; 382/103; 236/51; 236/46

(58) Field of Classification Search
USPC .............. 374/121; 236/51, 46; 382/103
See application file for complete search history.

(56) References Cited

U.S. PATENT DOCUMENTS

| 1,639,299 A | * | 8/1927 | Kinnard | 236/34 |
| 2,101,637 A | * | 12/1937 | Davis | 337/370 |

(Continued)

FOREIGN PATENT DOCUMENTS

| CA | 2202008 C | 2/2000 |
| DE | 19609390 A1 | 9/1997 |

(Continued)

OTHER PUBLICATIONS

Aprilaire Electronic Thermostats Model 8355 User's Manual, Research Products Corporation, 2000, 16 pages.

(Continued)

*Primary Examiner* — Lisa Caputo
*Assistant Examiner* — Jamel Williams
(74) *Attorney, Agent, or Firm* — Kilpatrick Townsend & Stockton LLP

(57) ABSTRACT

Provided according to one or more embodiments is a thermostat having a housing, the housing including a forward-facing surface, the thermostat comprising a passive infrared (PIR) motion sensor disposed inside the housing for sensing occupancy in the vicinity of the thermostat. The PIR motion sensor has a radiation receiving surface and is able to detect the lateral movement of an occupant in front of the forward-facing surface of the housing. The thermostat further comprises a grille member having one or more openings and included along the forward-facing surface of the housing, the grille member being placed over the radiation receiving surface of the PIR motion sensor. The grille member is configured and dimensioned to visually conceal and protect the PIR motion sensor disposed inside the housing, the visual concealment promoting a visually pleasing quality of the thermostat, while at the same time permitting the PIR motion sensor to effectively detect the lateral movement of the occupant. In one embodiment, the grille member openings are slit-like openings oriented along a substantially horizontal direction.

26 Claims, 11 Drawing Sheets

(56) References Cited

U.S. PATENT DOCUMENTS

| | | | |
|---|---|---|---|
| 2,492,774 A * | 12/1949 | Wild | 392/368 |
| 3,025,484 A * | 3/1962 | Cunningham | 338/31 |
| 3,991,357 A | 11/1976 | Kaminski | |
| 4,223,831 A | 9/1980 | Szarka | |
| 4,316,577 A | 2/1982 | Adams et al. | |
| 4,335,847 A | 6/1982 | Levine | |
| 4,408,711 A | 10/1983 | Levine | |
| 4,615,380 A | 10/1986 | Beckey | |
| 4,621,336 A | 11/1986 | Brown | |
| 4,674,027 A | 6/1987 | Beckey | |
| 4,685,614 A | 8/1987 | Levine | |
| 4,751,961 A | 6/1988 | Levine et al. | |
| 4,768,706 A | 9/1988 | Parfitt | |
| 4,897,798 A | 1/1990 | Cler | |
| 5,005,365 A | 4/1991 | Lynch | |
| D321,903 S | 11/1991 | Chepaitis | |
| 5,088,645 A | 2/1992 | Bell | |
| 5,211,332 A | 5/1993 | Adams | |
| 5,224,649 A | 7/1993 | Brown et al. | |
| 5,240,178 A | 8/1993 | Dewolf et al. | |
| 5,244,146 A | 9/1993 | Jefferson et al. | |
| D341,848 S | 11/1993 | Bigelow et al. | |
| 5,294,047 A | 3/1994 | Schwer et al. | |
| 5,303,612 A | 4/1994 | Odom et al. | |
| 5,395,042 A | 3/1995 | Riley et al. | |
| 5,415,346 A | 5/1995 | Bishop | |
| 5,476,221 A | 12/1995 | Seymour | |
| 5,482,209 A | 1/1996 | Cochran et al. | |
| 5,485,954 A | 1/1996 | Guy et al. | |
| 5,499,196 A | 3/1996 | Pacheco | |
| 5,555,927 A | 9/1996 | Shah | |
| 5,603,451 A | 2/1997 | Helander et al. | |
| 5,611,484 A | 3/1997 | Uhrich | |
| 5,627,531 A | 5/1997 | Posso et al. | |
| 5,673,850 A | 10/1997 | Uptegraph | |
| 5,690,277 A | 11/1997 | Flood | |
| D396,488 S | 7/1998 | Kunkler | |
| 5,808,294 A | 9/1998 | Neumann | |
| 5,808,602 A | 9/1998 | Sellers | |
| 5,902,183 A | 5/1999 | D'Souza | |
| 5,909,378 A | 6/1999 | De Milleville | |
| 5,918,474 A | 7/1999 | Khanpara et al. | |
| 5,931,378 A | 8/1999 | Schramm | |
| 5,959,621 A | 9/1999 | Nawaz et al. | |
| 5,977,964 A | 11/1999 | Williams et al. | |
| 6,020,881 A | 2/2000 | Naughton et al. | |
| 6,032,867 A | 3/2000 | Dushane et al. | |
| 6,062,482 A | 5/2000 | Gauthier et al. | |
| 6,066,843 A | 5/2000 | Scheremeta | |
| D428,399 S | 7/2000 | Kahn et al. | |
| 6,095,427 A | 8/2000 | Hoium et al. | |
| 6,098,893 A | 8/2000 | Berglund et al. | |
| D435,473 S * | 12/2000 | Eckel et al. | D10/106.8 |
| 6,164,374 A | 12/2000 | Rhodes et al. | |
| 6,196,468 B1 * | 3/2001 | Young | 236/46 R |
| 6,206,295 B1 | 3/2001 | LaCoste | |
| 6,207,899 B1 * | 3/2001 | Gillespie | 174/66 |
| 6,211,921 B1 | 4/2001 | Cherian et al. | |
| 6,213,404 B1 | 4/2001 | Dushane et al. | |
| 6,216,956 B1 | 4/2001 | Ehlers et al. | |
| 6,286,764 B1 | 9/2001 | Garvey et al. | |
| 6,298,285 B1 | 10/2001 | Addink et al. | |
| D450,059 S | 11/2001 | Itou | |
| 6,347,747 B1 * | 2/2002 | Nesbitt | 236/78 D |
| 6,349,883 B1 | 2/2002 | Simmons et al. | |
| 6,351,693 B1 | 2/2002 | Monie et al. | |
| 6,356,204 B1 | 3/2002 | Guindi et al. | |
| 6,370,894 B1 | 4/2002 | Thompson et al. | |
| 6,453,687 B2 | 9/2002 | Sharood et al. | |
| D464,660 S | 10/2002 | Weng et al. | |
| 6,478,233 B1 | 11/2002 | Shah | |
| 6,502,758 B2 | 1/2003 | Cottrell | |
| D471,825 S | 3/2003 | Peabody | |
| 6,595,430 B1 | 7/2003 | Shah | |
| D480,401 S | 10/2003 | Kahn et al. | |
| 6,636,197 B1 | 10/2003 | Goldenberg et al. | |
| 6,641,054 B2 | 11/2003 | Morey | |
| 6,641,055 B1 | 11/2003 | Tieman | |
| 6,644,557 B1 | 11/2003 | Jacobs | |
| 6,645,066 B2 | 11/2003 | Gutta et al. | |
| D485,279 S | 1/2004 | DeCombe | |
| 6,726,112 B1 | 4/2004 | Ho | |
| D491,956 S | 6/2004 | Ombao et al. | |
| 6,769,482 B2 | 8/2004 | Wagner et al. | |
| D497,617 S | 10/2004 | Decombe et al. | |
| 6,814,299 B1 | 11/2004 | Carey | |
| 6,824,069 B2 | 11/2004 | Rosen | |
| D503,631 S | 4/2005 | Peabody | |
| 6,951,306 B2 | 10/2005 | DeLuca | |
| D511,527 S | 11/2005 | Hernandez et al. | |
| 6,990,821 B2 | 1/2006 | Singh et al. | |
| 7,000,849 B2 | 2/2006 | Ashworth et al. | |
| 7,024,336 B2 | 4/2006 | Salsbury et al. | |
| 7,028,912 B1 | 4/2006 | Rosen | |
| 7,035,805 B2 | 4/2006 | Miller | |
| 7,083,109 B2 | 8/2006 | Pouchak | |
| 7,108,194 B1 | 9/2006 | Hankins, II | |
| 7,109,970 B1 | 9/2006 | Miller | |
| 7,111,788 B2 | 9/2006 | Reponen | |
| 7,114,554 B2 | 10/2006 | Bergman et al. | |
| 7,140,551 B2 | 11/2006 | de Pauw et al. | |
| 7,141,748 B2 | 11/2006 | Tanaka et al. | |
| 7,142,948 B2 | 11/2006 | Metz | |
| 7,149,729 B2 | 12/2006 | Kaasten et al. | |
| 7,152,806 B1 | 12/2006 | Rosen | |
| 7,156,318 B1 | 1/2007 | Rosen | |
| 7,159,789 B2 | 1/2007 | Schwendinger et al. | |
| 7,159,790 B2 | 1/2007 | Schwendinger et al. | |
| 7,181,317 B2 | 2/2007 | Amundson et al. | |
| 7,188,482 B2 | 3/2007 | Sadegh et al. | |
| 7,222,494 B2 | 5/2007 | Peterson et al. | |
| 7,225,054 B2 | 5/2007 | Amundson et al. | |
| D544,877 S | 6/2007 | Sasser | |
| 7,258,280 B2 | 8/2007 | Wolfson | |
| D550,691 S | 9/2007 | Hally et al. | |
| 7,264,175 B2 | 9/2007 | Schwendinger et al. | |
| 7,274,972 B2 | 9/2007 | Amundson et al. | |
| 7,287,709 B2 | 10/2007 | Proffitt et al. | |
| 7,299,996 B2 | 11/2007 | Garrett et al. | |
| 7,302,642 B2 | 11/2007 | Smith et al. | |
| 7,333,880 B2 | 2/2008 | Brewster et al. | |
| D566,587 S | 4/2008 | Rosen | |
| 7,379,791 B2 | 5/2008 | Tamarkin et al. | |
| RE40,437 E | 7/2008 | Rosen | |
| 7,418,663 B2 | 8/2008 | Pettinati et al. | |
| 7,434,742 B2 | 10/2008 | Mueller et al. | |
| 7,451,937 B2 | 11/2008 | Flood et al. | |
| 7,455,240 B2 | 11/2008 | Chapman, Jr. et al. | |
| 7,469,550 B2 | 12/2008 | Chapman, Jr. et al. | |
| D588,152 S | 3/2009 | Okada | |
| 7,498,576 B2 * | 3/2009 | Micko | 250/338.4 |
| 7,509,753 B2 | 3/2009 | Nicosia et al. | |
| D589,792 S | 4/2009 | Clabough et al. | |
| D590,412 S | 4/2009 | Saft et al. | |
| D593,120 S | 5/2009 | Bouchard et al. | |
| D594,015 S | 6/2009 | Singh et al. | |
| D595,309 S | 6/2009 | Saski et al. | |
| 7,555,364 B2 | 6/2009 | Poth et al. | |
| D596,194 S | 7/2009 | Vu et al. | |
| D597,101 S | 7/2009 | Chaudhri et al. | |
| 7,558,648 B2 | 7/2009 | Hoglund et al. | |
| D598,463 S | 8/2009 | Hirsch et al. | |
| 7,571,014 B1 | 8/2009 | Lambourne et al. | |
| 7,575,179 B2 | 8/2009 | Morrow et al. | |
| D599,810 S | 9/2009 | Scalisi et al. | |
| 7,584,899 B2 | 9/2009 | de Pauw et al. | |
| 7,600,694 B2 | 10/2009 | Helt et al. | |
| D603,277 S | 11/2009 | Clausen et al. | |
| D603,421 S | 11/2009 | Ebeling et al. | |
| D604,740 S | 11/2009 | Matheny et al. | |
| 7,614,567 B2 | 11/2009 | Chapman, Jr. et al. | |
| 7,620,996 B2 | 11/2009 | Torres et al. | |
| D607,001 S | 12/2009 | Ording | |
| 7,624,931 B2 | 12/2009 | Chapman, Jr. et al. | |

(56) References Cited

U.S. PATENT DOCUMENTS

| | | |
|---|---|---|
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,854,389 B2 | 12/2010 | Ahmed |
| D630,649 S | 1/2011 | Tokunaga et al. |
| 7,904,209 B2 | 3/2011 | Podgorny et al. |
| 7,904,830 B2 | 3/2011 | Hoglund et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| 8,037,022 B2 | 10/2011 | Rahman et al. |
| D648,735 S | 11/2011 | Arnold et al. |
| D651,529 S | 1/2012 | Mongell et al. |
| 8,090,477 B1 | 1/2012 | Steinberg |
| 8,091,375 B2 | 1/2012 | Crawford |
| 8,091,794 B2 | 1/2012 | Siddaramanna et al. |
| 8,131,497 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,442,695 B2 | 5/2013 | Imes et al. |
| 2002/0005435 A1 | 1/2002 | Cottrell |
| 2003/0042320 A1 | 3/2003 | Decker |
| 2003/0112262 A1 | 6/2003 | Adatia et al. |
| 2004/0034484 A1 | 2/2004 | Solomita, Jr. et al. |
| 2004/0055446 A1 | 3/2004 | Robbin et al. |
| 2004/0074978 A1 | 4/2004 | Rosen |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0043907 A1 | 2/2005 | Eckel et al. |
| 2005/0071780 A1 | 3/2005 | Muller et al. |
| 2005/0090915 A1 | 4/2005 | Geiwitz |
| 2005/0119766 A1 | 6/2005 | Amundson et al. |
| 2005/0119793 A1 | 6/2005 | Amundson et al. |
| 2005/0128067 A1 | 6/2005 | Zakrewski |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0204997 A1 | 9/2005 | Fournier |
| 2005/0280421 A1 | 12/2005 | Yomoda et al. |
| 2006/0186214 A1 | 8/2006 | Simon et al. |
| 2006/0196953 A1 | 9/2006 | Simon et al. |
| 2006/0266949 A1 | 11/2006 | Bender et al. |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0115902 A1 | 5/2007 | Shamoon et al. |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0006709 A1 | 1/2008 | Ashworth et al. |
| 2008/0015742 A1 | 1/2008 | Kulyk et al. |
| 2008/0054082 A1 | 3/2008 | Evans et al. |
| 2008/0151458 A1* | 6/2008 | Beland et al. ............... 361/114 |
| 2008/0191045 A1 | 8/2008 | Harter |
| 2008/0215240 A1 | 9/2008 | Howard et al. |
| 2008/0238660 A1* | 10/2008 | Dayton et al. ........... 340/539.14 |
| 2008/0245480 A1 | 10/2008 | Knight et al. |
| 2008/0273754 A1* | 11/2008 | Hick et al. .................... 382/103 |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0014654 A1 | 1/2009 | Zhevelev et al. |
| 2009/0065755 A1* | 3/2009 | Kates ......................... 236/49.3 |
| 2009/0082693 A1 | 3/2009 | Stafford |
| 2009/0140056 A1 | 6/2009 | Leen |
| 2009/0140057 A1 | 6/2009 | Leen |
| 2009/0143916 A1 | 6/2009 | Boll et al. |
| 2009/0171862 A1 | 7/2009 | Harrod et al. |
| 2009/0215534 A1 | 8/2009 | Wilson et al. |
| 2009/0254225 A1 | 10/2009 | Boucher et al. |
| 2009/0259713 A1 | 10/2009 | Blumrich et al. |
| 2009/0263773 A1 | 10/2009 | Kotlyar et al. |
| 2009/0273610 A1 | 11/2009 | Busch et al. |
| 2009/0283603 A1 | 11/2009 | Peterson et al. |
| 2009/0297901 A1 | 12/2009 | Kilian et al. |
| 2009/0312968 A1* | 12/2009 | Phillips ........................... 702/62 |
| 2009/0327354 A1 | 12/2009 | Resnick et al. |
| 2010/0012737 A1* | 1/2010 | Kates ......................... 236/49.3 |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0084482 A1 | 4/2010 | Kennedy et al. |
| 2010/0106305 A1 | 4/2010 | Pavlak et al. |

(56) References Cited

U.S. PATENT DOCUMENTS

| | | | |
|---|---|---|---|
| 2010/0107070 A1 | 4/2010 | Devineni et al. | |
| 2010/0107076 A1 | 4/2010 | Grohman et al. | |
| 2010/0122167 A1 | 5/2010 | Ryu | |
| 2010/0167783 A1 | 7/2010 | Alameh et al. | |
| 2010/0179704 A1 | 7/2010 | Ozog | |
| 2010/0198425 A1 | 8/2010 | Donovan | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0015798 A1 | 1/2011 | Golden et al. | |
| 2011/0015802 A1 | 1/2011 | Imes | |
| 2011/0046756 A1 | 2/2011 | Park | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0077896 A1 | 3/2011 | Steinberg et al. | |
| 2011/0151837 A1 | 6/2011 | Winbush, III | |
| 2011/0160913 A1 | 6/2011 | Parker et al. | |
| 2011/0166712 A1* | 7/2011 | Kramer et al. | 700/278 |
| 2011/0167369 A1 | 7/2011 | van Os | |
| 2011/0185895 A1 | 8/2011 | Freen | |
| 2011/0307103 A1 | 12/2011 | Cheung et al. | |
| 2012/0017611 A1 | 1/2012 | Coffel et al. | |
| 2012/0024969 A1* | 2/2012 | Kates | 236/49.3 |
| 2012/0031984 A1* | 2/2012 | Feldmeier et al. | 236/49.3 |
| 2012/0065935 A1 | 3/2012 | Steinberg et al. | |
| 2012/0085831 A1 | 4/2012 | Kopp | |
| 2012/0131504 A1 | 5/2012 | Fadell et al. | |
| 2012/0158350 A1 | 6/2012 | Steinberg et al. | |
| 2012/0221151 A1 | 8/2012 | Steinberg | |
| 2013/0073506 A1* | 3/2013 | Camp et al. | 706/46 |

FOREIGN PATENT DOCUMENTS

| | | |
|---|---|---|
| EP | 434926 A2 | 7/1991 |
| EP | 196069 B1 | 12/1991 |
| EP | 720077 A2 | 7/1996 |
| EP | 802471 A2 | 10/1997 |
| EP | 1065079 A2 | 1/2001 |
| EP | 1731984 A1 | 12/2006 |
| EP | 2157492 A2 | 2/2010 |
| EP | 1703356 B1 | 9/2011 |
| GB | 2212317 B | 5/1992 |
| JP | 59106311 A | 6/1984 |
| JP | 01252850 A | 10/1989 |
| JP | 2002087050 A | 3/2002 |
| JP | 2003054290 A | 2/2003 |
| NL | 1024986 C2 | 6/2005 |
| WO | 0248851 A2 | 6/2002 |
| WO | 2009073496 A2 | 6/2009 |
| WO | 2011128416 A2 | 10/2011 |

OTHER PUBLICATIONS

Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Energy Joule, Ambient Devices, 2011, [retrieved on Aug. 1, 2012]. Retrieved from: http://web.archive.org/web/20110723210421/http://www.ambientdevices.com/products/energyjoule.html, 3 pages.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321 and TXH9421 Product Data, Honeywell International, Inc., 68-0311, No Date Given, 126 pages.
Honeywell Prestige THX9321-9421 Operating Manual, Honeywell International, Inc., 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
Hunter Internet Thermostat Installation Guide, Hunter Fan Co., 2012, 8 pages.
ICY 3815TT-001 Timer-Thermostat Package Box, ICY BV Product Bar Code No. 8717953007902, 2009, 2 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owner's Guide, Lennox Industries, Inc., 2007, 32 pages.
Lennox ComfortSense 7000 Owner's Guide, Lennox Industries, Inc., 2009, 15 pages.
Lennox iComfort Manual, Lennox Industries, Inc., 2010, 20 pages.
Lux PSPU732T Manual, LUX Products Corporation, 48 pages.
NetX RP32-WIFI Network Thermostat Consumer Brochure, Network Thermostat, No Date Given, 2 pages.
NetX RP32-WIFI Network Thermostat Specification Sheet, Network Thermostat, 2012, 2 pages.
RobertShaw Product Manual 9620, Maple Chase Company, 2001, 14 pages.
RobertShaw Product Manual 9825i2, Maple Chase Company, 2006, 36 pages.
SYSTXCCUIZ01-V Infinity Control Installation Instructions, Carrier Corp, 2012, 20 pages.
T8611G Chronotherm IV Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
The Perfect Climate Comfort Center PC8900A W8900A-C Product Data Sheet, Honeywell International Inc, 2001, 44 pages.
TP-PAC, TP-PHP, TP-NAC, TP-NHP Performance Series AC/HP Thermostat Installation Instructions, Carrier Corp, 2007, 56 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900 Manual, Venstar, Inc., 2008, 113 pages.
Venstar T5800 Manual, Venstar, Inc., 63 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc. Operating Manual, 2012, 48 pages.
White Rodgers (Emerson) Model 1F81-261 Installation and Operating Instructions, White Rodgers, No Date Given, 8 pages.
White Rodgers (Emerson) Model IF98EZ-1621 Homeowner's User Guide, White Rodgers, 28 pages.

(56) References Cited

OTHER PUBLICATIONS

U.S. Appl. No. 60/512,886, Volkswagen Rotary Knob for Motor Vehicle—English Translation of German Application filed Oct. 20, 2003.

Allen et al., "Real-Time Earthquake Detection and Hazard Assessment by ElarmS Across California", Geophysical Research Letters, vol. 36, L00B08, 2009, pp. 1-6.

Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.

Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.

Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.

Arens et al., "New Thermostat Demand Response Enabling Technology", Poster, University of California Berkeley, Jun. 10, 2004.

Auslander et al., "UC Berkeley DR Research Energy Management Group", Power Point Presentation, DR ETD Workshop, State of California Energy Commission, Jun. 11, 2007, pp. 1-35.

Chen et al., "Demand Response-Enabled Residential Thermostat Controls", Abstract, ACEEE Summer Study on Energy Efficiency in Buildings, Mechanical Engineering Dept. and Architecture Dept., University of California Berkeley., 2008, pp. 1-24 through 1-36.

Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.

Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.

Green, "Thermo Heat Tech Cool", Popular Mechanics Electronic Thermostat Guide, Oct. 1985, pp. 155-158.

Loisos et al., "Buildings End-Use Energy Efficiency: Alternatives to Compressor Cooling", California Energy Commission, Public Interest Energy Research, Jan. 2000, 80 pages.

Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.

Meier et al., "Thermostat Interface Usability: A Survey", Ernest Orlando Lawrence Berkeley National Laboratory, Environmental Energy Technologies Division, Berkeley California, Sep. 2010, pp. 1-73.

Mozer, "The Neural Network House: An Environmental that Adapts to it's Inhabitants", AAAI Technical Report SS-98-02, 1998, pp. 110-114.

International Patent Application No. PCT/US2011/061479, International Search Report, issued Apr. 11, 2012.

Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley, 2008, pp. 7-242 through 7-253.

Peffer et al., "Smart Comfort at Home: Design of a Residential Thermostat to Achieve Thermal Comfort, and Save Money and Peak Energy", University of California Berkeley, Mar. 2007, 1 page.

Salus, "S-Series Digital Thermostat Instruction Manual-ST620 Model No. Instruction Manual", www.salus-tech.com, Version 005, Apr. 29, 2010, 24 pages.

Sanford, "iPod (Click Wheel) (2004)", www.apple-history.com [retrieved on Apr. 9, 2012]. Retrieved from: http://apple-history.com/ipod, Apr. 9, 2012, 2 pages.

Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.

PCT/US2011/061479, International Preliminary Report on Patentability, mailed Aug. 1, 2013, 11 pages.

\* cited by examiner

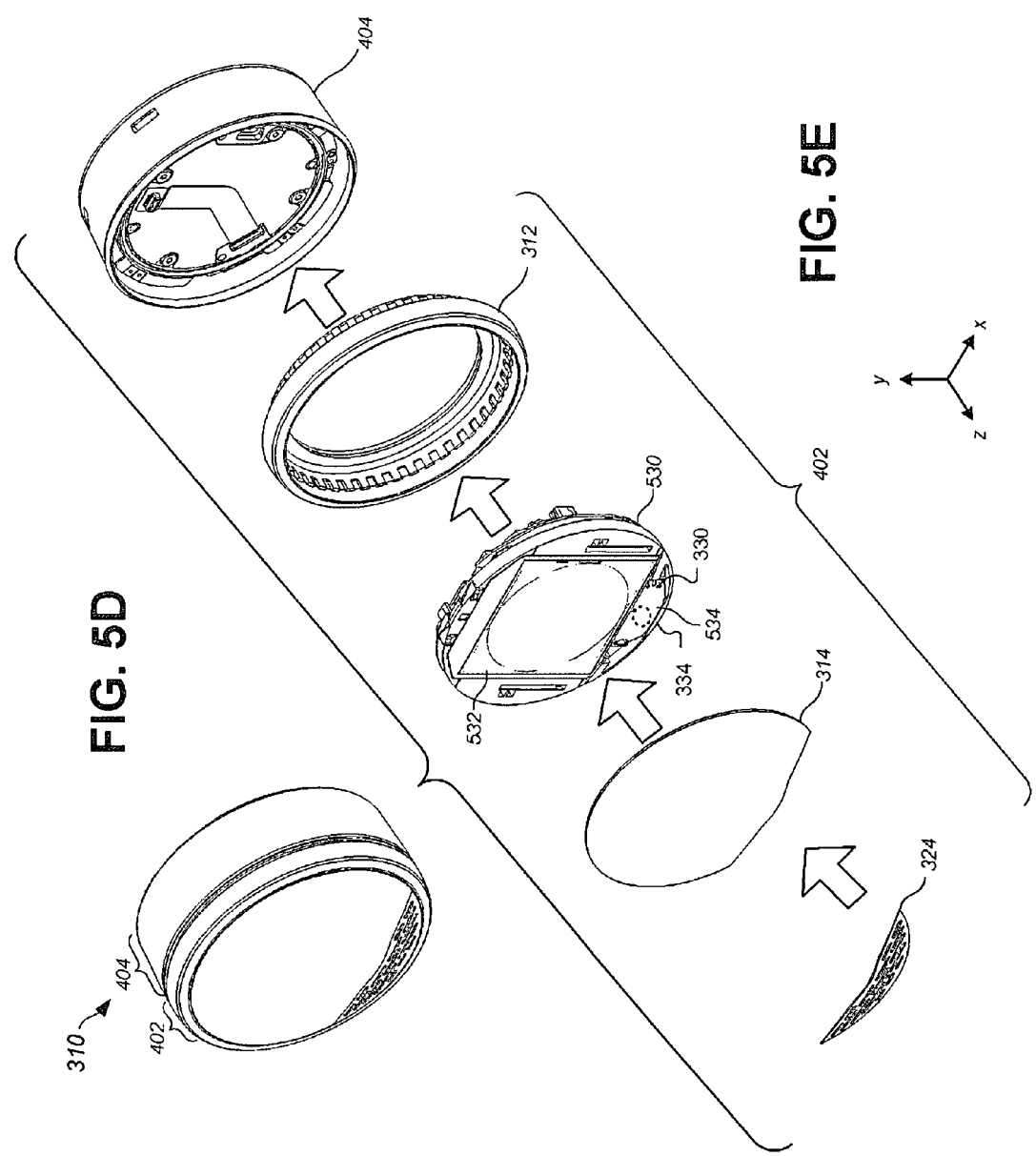

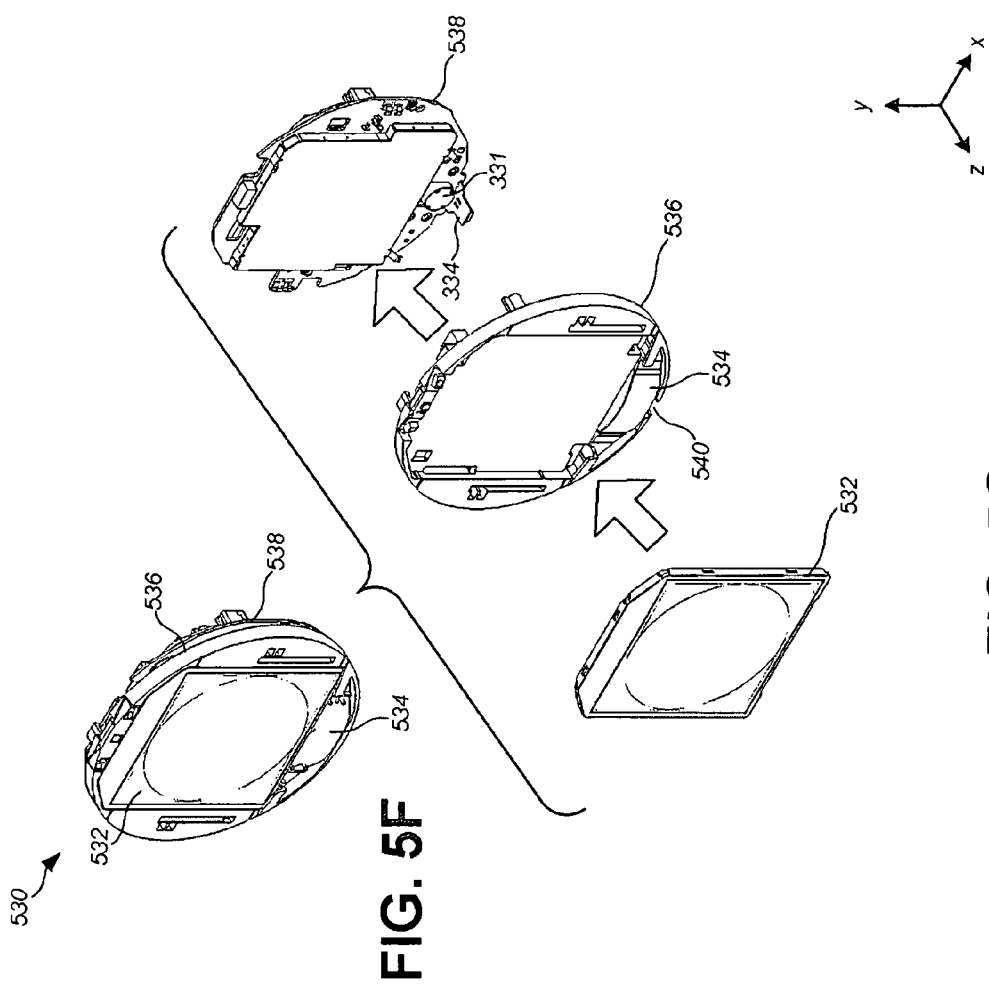

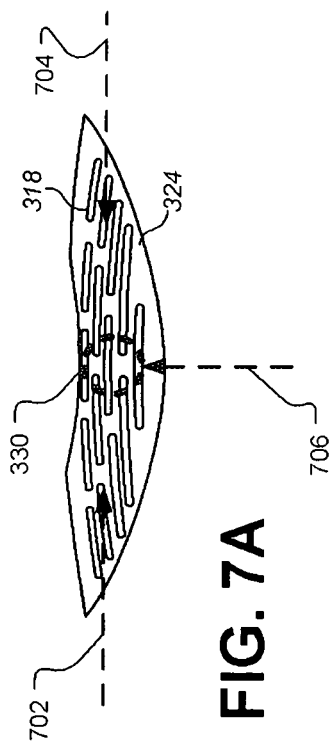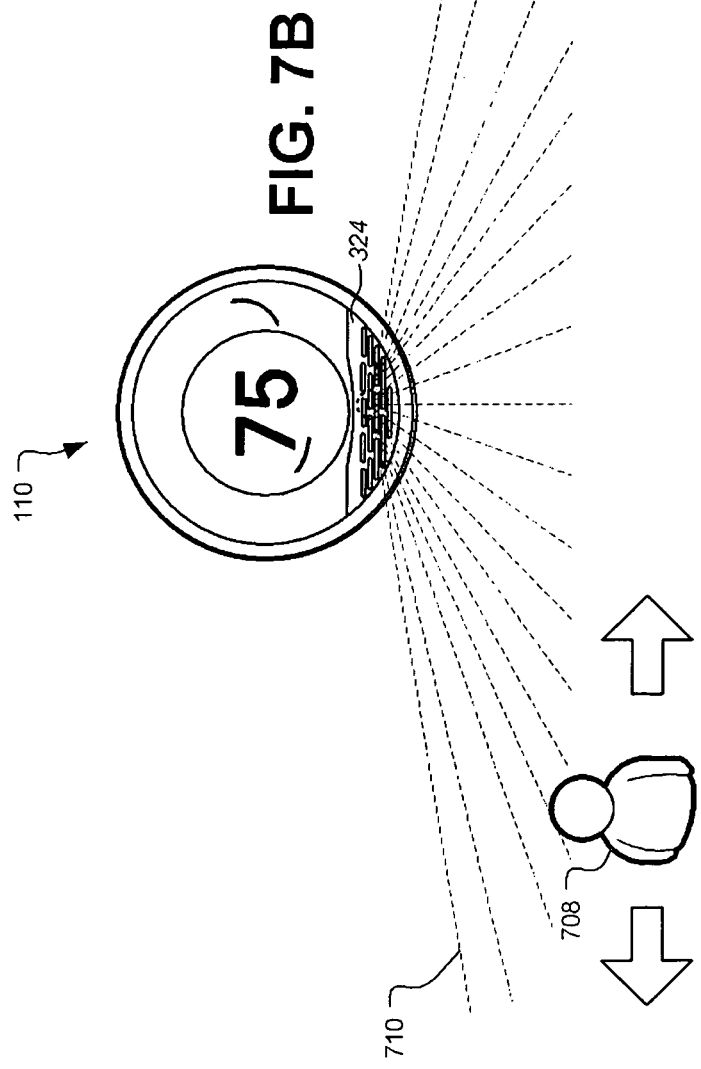

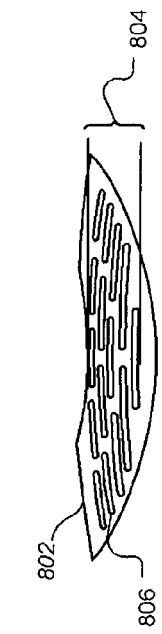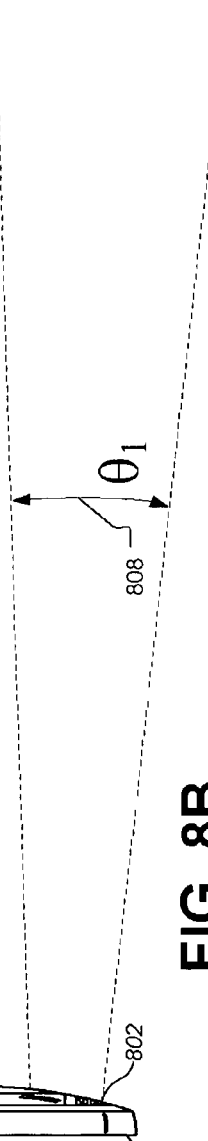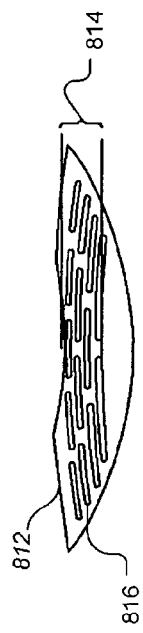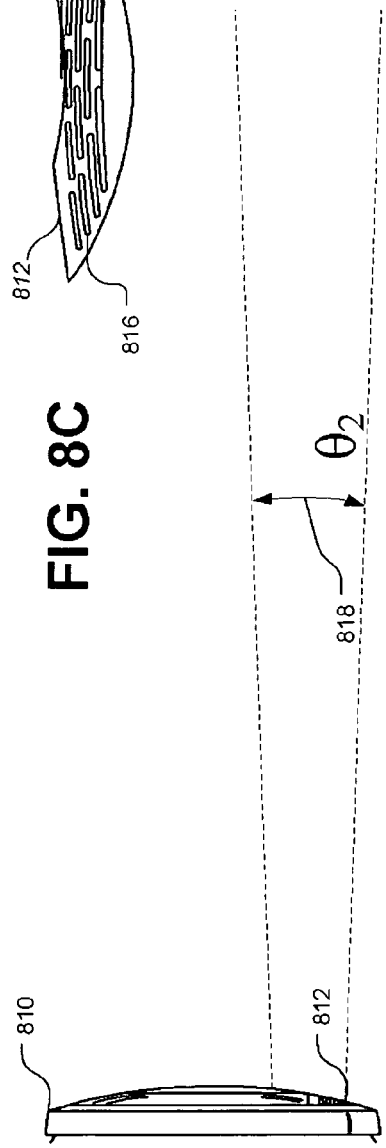

SYSTEM AND METHOD FOR INTEGRATING SENSORS IN THERMOSTATS

CROSS-REFERENCE TO RELATED APPLICATIONS

This application is a continuation-in-part of U.S. Ser. No. 13/033,573 filed Feb. 23, 2011, which is incorporated by reference herein. The subject matter of this patent specification relates to the subject matter of the following commonly assigned applications: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 29/386,021 filed Feb. 23, 2011; U.S. Ser. No. 13/034,666 filed Feb. 24, 2011; U.S. Ser. No. 13/034,674 filed Feb. 24, 2011; and U.S. Ser. No. 13/034,678 filed Feb. 24, 2011; U.S. Ser. No. 13/038,191 filed Mar. 1, 2011; and U.S. Ser. No. 13/038,206 filed Mar. 1, 2011. Each of the above-referenced patent applications is incorporated by reference herein. The above-referenced patent applications are collectively referenced hereinbelow as "the commonly assigned incorporated applications."

TECHNICAL FIELD

This patent specification relates to system monitoring and control, such as the monitoring and control of heating, ventilation, and air conditioning (HVAC) systems. More particularly, this patent specification relates to systems and methods that facilitate the integration of one or more sensors in a monitoring and control device, such as a thermostat, in a manner that protects and hides the sensors from view while also preserving and/or enhancing the effectiveness of their sensing functionality.

BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

It would be beneficial, at both a societal level and on a per-home basis, for a large number of homes to have their existing older thermostats replaced by newer, microprocessor controlled "intelligent" thermostats having more advanced HVAC control capabilities that can save energy while also keeping the occupants comfortable. To do this, these thermostats will need more information from the occupants as well as the environments where the thermostats are located. Sensors in the home will gather real-time and historic data, such as occupancy data, to be used by thermostat to automate the HVAC controls. By analyzing this data, thermostats will make decisions on heating, cooling and saving energy. For at least this reason, it is important to make sure sensors used by thermostats produce accurate data. At the same time, however, there is a tension that can arise between increasing the number and kinds of sensors on the thermostat, on the one hand, while also provisioning the thermostat with a reasonably compact and visually pleasing form factor, on the other hand, for increasing the overall appeal of the intelligent thermostat to the purchasing public.

SUMMARY

Provided according to one or more embodiments is a thermostat having a housing, the housing including a forward-facing surface, the thermostat comprising a passive infrared (PIR) motion sensor disposed inside the housing for sensing occupancy in the vicinity of the thermostat. The PIR motion sensor has a radiation receiving surface and is able to detect the lateral movement of an occupant in front of the forward-facing surface of the housing. The thermostat further comprises a grille member having one or more openings and included along the forward-facing surface of the housing, the grille member being placed over the radiation receiving surface of the PIR motion sensor. The grille member is configured and dimensioned to visually conceal and protect the PIR motion sensor disposed inside the housing, the visual concealment promoting a visually pleasing quality of the thermostat, while at the same time permitting the PIR motion sensor to effectively detect the lateral movement of the occupant. In one embodiment, the grille member openings are slit-like openings oriented along a substantially horizontal direction.

In one embodiment a temperature sensor is also positioned behind the grille member, the temperature sensor also being visually concealed behind the grille member. In one embodiment the grille member is formed from a thermally conductive material such as a metal, and the temperature sensor is placed in thermal communication with the metallic grille, such as by using a thermal paste or the like. Advantageously, in addition to exposing the temperature sensor to ambient room air by virtue of the grille openings, the metallic grille member can further improve temperature sensing performance by acting as a sort of "thermal antenna" for the temperature sensor.

BRIEF DESCRIPTION OF THE DRAWINGS

FIGS. 5A-5G illustrate a thermostat in various states of disassembly and the position of a grille member designed in accordance with the present invention in relationship to sensors and other components associated with the thermostat;

FIG. 7A-7B illustrates infrared sources interacting with the slit-like openings in a grille member designed in accordance with the present invention;

FIGS. 8A-8D illustrate altering the openings of a grille member along a vertical distance to change the sensitivity of a PIR motion sensor in accordance with aspects of the present invention.

DETAILED DESCRIPTION OF THE INVENTION

In the following detailed description, for purposes of explanation, numerous specific details are set forth to provide a thorough understanding of the various implementations of the present invention. Those of ordinary skill in the art will realize that these various implementations of the present invention are illustrative only and are not intended to be limiting in any way. Other implementations of the present invention will readily suggest themselves to such skilled persons having the benefit of this disclosure.

In addition, for clarity purposes, not all of the routine features of the implementations described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more implementations are described further herein in the context of typical HVAC system used in a residential home, such as single-family residential home, the scope of the present teachings is not so limited. More generally, thermostats according to one or more of the preferred implementations are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Figure 1:
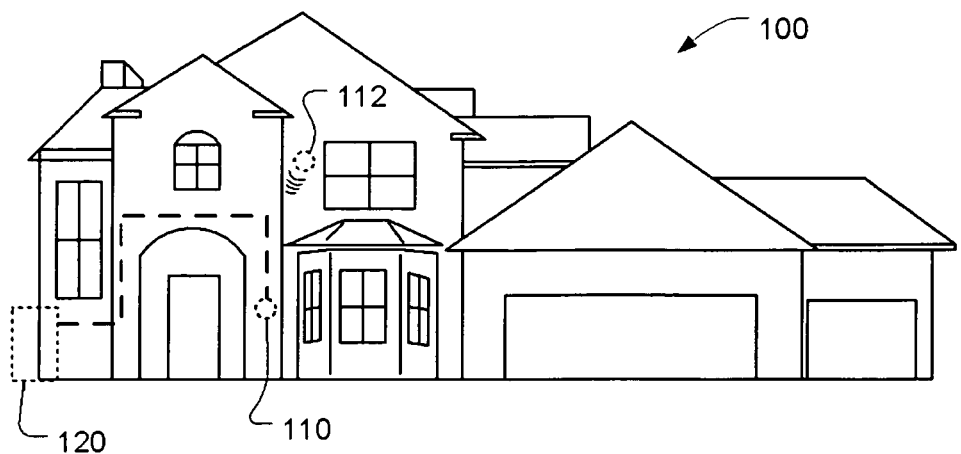
FIG. 1 is a diagram illustrating an exemplary enclosure using a thermostat implemented in accordance with aspects of the present invention for controlling one or more environmental conditions.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using thermostat 110 for the control of heating and cooling provided by an HVAC system 120. Alternate implementations of the present invention may be used with other types of enclosures including a duplex, an apartment within an apartment building, a light commercial structure such as an office or retail store, or a structure or enclosure that is a combination of these and other types of enclosures.

Some implementations of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Thermostat 110 uses a grille member (not shown in FIG. 1) implemented in accordance with the present invention to cover the sensors. In part, the grille member of the present invention adds to the appeal and attraction of the thermostat 110 as the sensors in thermostat 110 do not protrude, or attract attention from occupants of enclosure 100 and the thermostat 110 fits with almost any decor. Keeping sensors within thermostat 110 also reduces the likelihood of damage and loss of calibration during manufacture, delivery, installation or use of thermostat 110. Yet despite covering these sensors, the specialized design of the grille member facilitates accurately gathering occupancy, temperature and other data from the environment. Further details on this design and other aspects of the grille member are also described in detail later herein.

In some implementations, thermostat 110 may wirelessly communicate with remote device 112 gathering information remotely from the user and from the environment detectable by the remote device 112. For example, the remote device 112 can wirelessly communicate with the thermostat 110 providing user input from the remote location of remote device 112 or may be used to display information to a user, or both. Like thermostat 110, implementations of remote device 112 may also include sensors to gather data related to occupancy, temperature, light and other environmental conditions. A grille member (not shown in FIG. 1) designed in accordance with the present invention may also be used to conceal these sensors maintaining an attractive and pleasing appearance of the remote device 112 within the enclosure 100. In an alternate implementation, remote device 112 may also be located outside of the enclosure 100.

Figure 2:
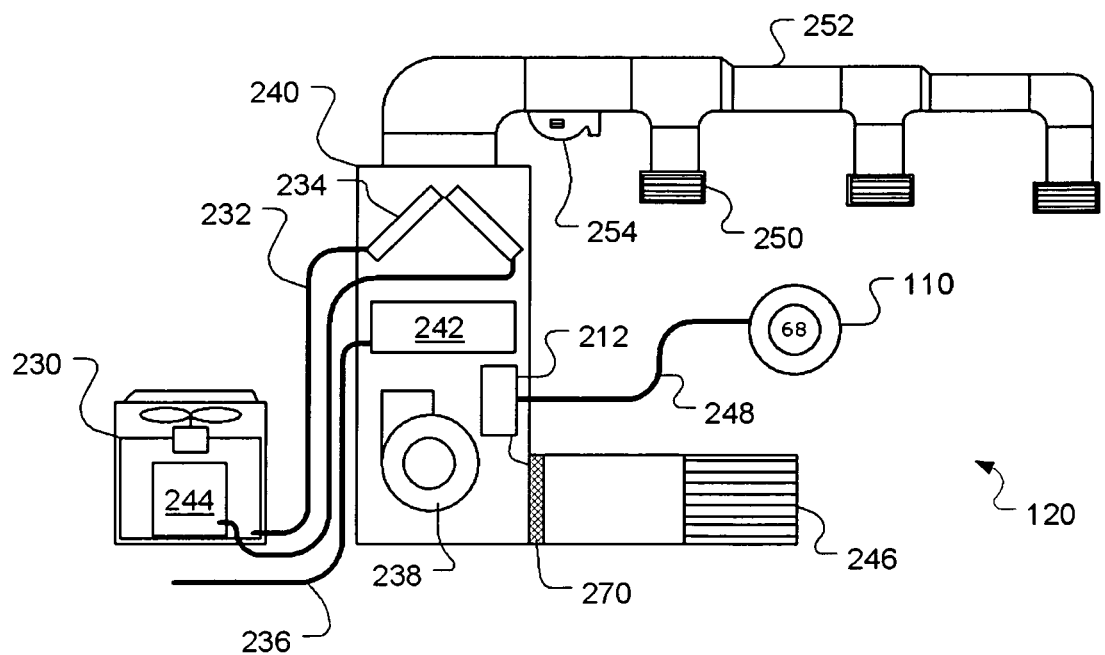
FIG. 2 is a schematic diagram of an HVAC system controlled using a thermostat designed in accordance with implementations of the present invention.

FIG. 2 is a schematic diagram of an HVAC system controlled using a thermostat designed in accordance with implementations of the present invention. HVAC system 120 provides heating, cooling, ventilation, and/or air handling for an enclosure, such as a single-family home 100 depicted in FIG. 1. System 120 depicts a forced air type heating and cooling system, although according to other implementations, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various implementations that returns moisture to the air before it passes through duct system 252. Although not shown in FIG. 2, alternate implementations of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
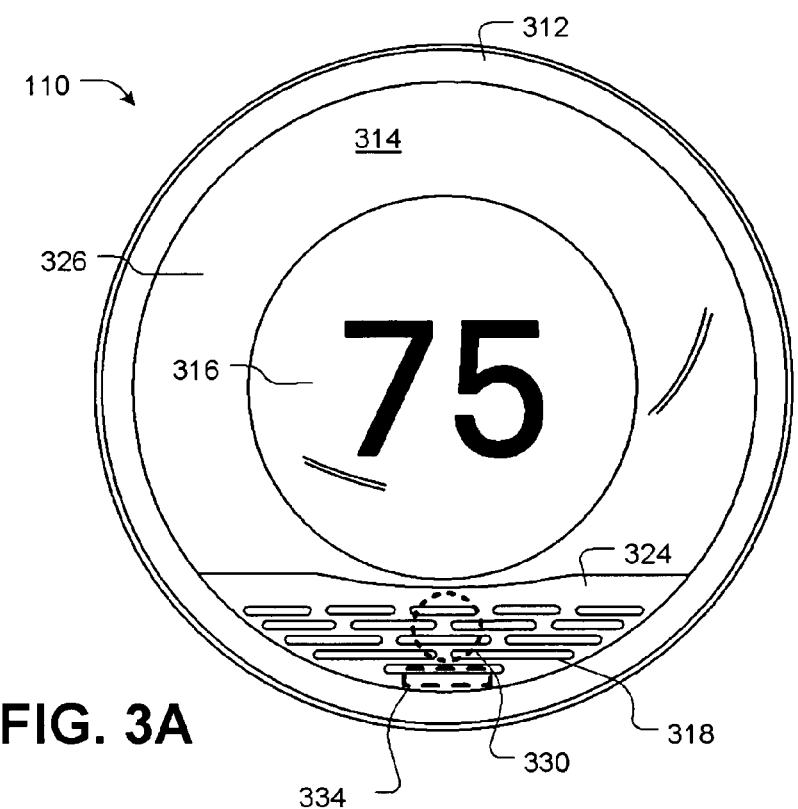
FIGS. 3A-3B illustrate a grille member affixed to a forward-facing surface of a thermostat designed in accordance with implementations of the present invention.
Figure 3B:
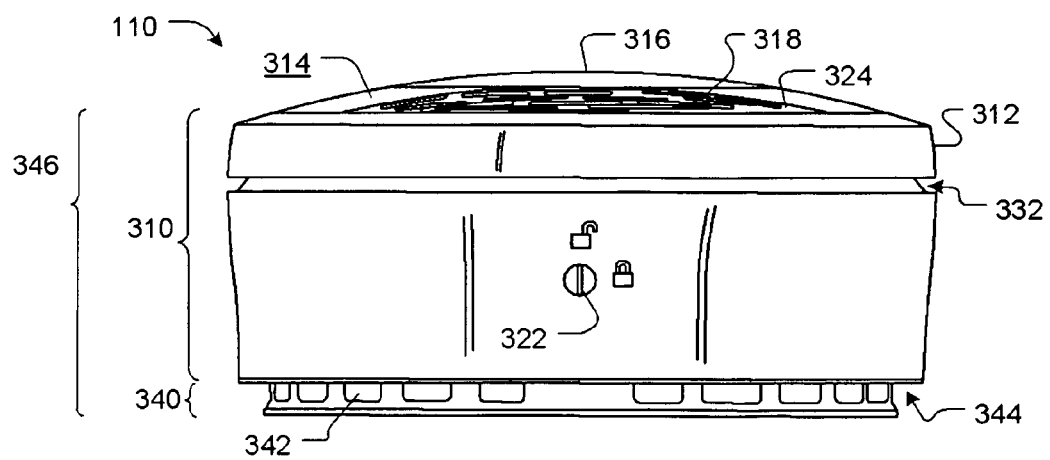

FIGS. 3A-3B illustrate a grille member incorporated in a thermostat designed in accordance with implementations of the present invention. Thermostat 110 includes control circuitry and is electrically connected to an HVAC system, such as HVAC system 120 shown in FIG. 1 and FIG. 2. The design of a grille member 324 compliments the sleek, simple, uncluttered and elegant design of thermostat 110 while facilitating the integration and operation of sensors located within a housing 346 of the thermostat. In the implementation as illustrated, thermostat 110 is enclosed by housing 346 with a forward-facing surface including a cover 314 and the grille member 324. Some implementations of housing 346 include a backplate 340 and a head unit 310. Housing 346 provides an attractive and durable configuration for one or more integrated sensors used by thermostat 110 and contained therein. In some implementations, grille member 324 may be flush-mounted with the cover 314 on the forward-facing surface of housing 346. Together grille member 324 as incorporated in housing 346 does not detract from home or commercial decor, and indeed can serve as a visually pleasing centerpiece for the immediate location in which it is located.

A central display area 316 of cover 314 allows information related to the operation of the thermostat to be displayed while an outer area 326 of cover 314 may be made opaque using a paint or smoke finish. For example, central display area 316 may be used to display a current temperature as illustrated in FIG. 3A with the numerals, "75" indicating 75 degrees.

Grille member 324 is designed to conceal sensors from view promoting a visually pleasing quality of the thermostat yet permitting them to receive their respective signals. Openings 318 in grille member 324 along the forward-facing surface of the housing allow signals to pass through that would otherwise not pass through cover 314. For example, glass, polycarbonate or other similar materials used for cover 314 are capable of transmitting visible light but are highly attenuating to infrared energy having longer wavelengths in the range of 10 microns, which is the radiation band of operation for many passive infrared (PIR) occupancy sensors. Notably, included in the thermostat according to some preferred implementations is an ambient light sensor (not shown) and an active proximity sensor (not shown) positioned near the top of the thermostat just behind the cover 314. Unlike PIR sensors, the ambient light sensor and active proximity sensor are configured to detect electromagnetic energy in the visible and shorter-infrared spectrum bands having wavelengths less than 1 micron, for which the glass or polycarbonate materials of the cover 314 are not highly attenuating. In some implementations, grille member 324 includes openings 318 in accordance with one or more implementations that allow the longer-wavelength infrared radiation to pass through the openings towards a passive infrared (PIR) motion sensor 330 as illustrated. Because grille member 324 is mounted over the radiation receiving surface of PIR motion sensor 330, PIR motion sensor 330 continues to receive the longer wavelength infrared radiation through the openings 318 and detect occupancy in an enclosure.

Additional implementations of grille member 324 also facilitate additional sensors to detect other environmental conditions. In some implementations, grille member 324 helps a temperature sensor 334 situated inside of housing 346 measure the ambient temperature of air. Openings 318 in grille member 324 promote air flow towards temperature sensor 334 located below grille member 324 thus conveying outside temperatures to the interior of housing 346. In further implementations, grille member 324 may be thermally coupled to temperature sensor 334 promoting a transfer of heat from outside the housing 346. Details on the operation of grille member 324 with these and other sensors are described in further detail later herein.

Implementations of thermostat 110 are circular in shape and have an outer ring 312 for receiving user input. Side view of thermostat 110 in FIG. 3B further highlights this curved spherical shape of cover 314 and grille member 324 gently arcing outward matching the corresponding surface portion of outer ring 312. In some implementations, the curvature of cover 314 may tend to magnify information displayed in central display area 316 thus making information easier to read by users. The shape of thermostat 110 not only provides a visually appealing accent when it is mounted on the wall but a natural shape for users to touch and adjust with their hands. Accordingly, the diameter of thermostat 110 may be approximately 80 mm or another diameter that readily fits the hand. In various implementations, rotating outer ring 312 allows the user to make adjustments, such as selecting a new target temperature. For example, the target temperature may be increased by rotating the outer ring 312 clockwise and decreased by rotating the outer ring 312 counter-clockwise.

Preferably, outer ring 312 is mechanically mounted in a manner that provides a smooth yet viscous feel to the user, for further promoting an overall feeling of elegance while also reducing spurious or unwanted rotational inputs. According to various implementations, outer ring 312 rotates on plastic bearings and uses an optical digital encoder to measure the rotational movement and/or rotational position of the outer ring 312. In accordance with alternate implementations, other technologies such as mounting the outer ring 312 on a central shaft may be employed.

In accordance with implementations of the present invention, vents 342 facilitate ventilation through gap 332 between the outer ring 312 and the body of head unit 310; through gap 344 between the head unit 310 and the backplate 340, and into the backplate 340 via vents 342. Some of this air flow may also pass through openings 318 and over sensors concealed by grille member 324. In general, air circulation through gaps 332, 344, openings 318 and vents 342 serve at least two purposes. Firstly, the air circulation allows the ambient air to reach one or more sensors located inside the thermostat. Secondly, the air circulation allows electronics in thermostat 110 to cool such that heat from the electronics does not significantly effect the sensing of the ambient air characteristics. Aside from openings 318, other entrance areas for air circulation such as gap 332, gap 344 and vents 342 are visually hidden from the user as shown in FIGS. 3A-3B, thus allowing for a simple, visually uncluttered design that facilitates ease of use by users. Optional implementations of the present invention further include a locking mechanism that is engaged via turning the screw head 322 a quarter turn.

Figure 4A:
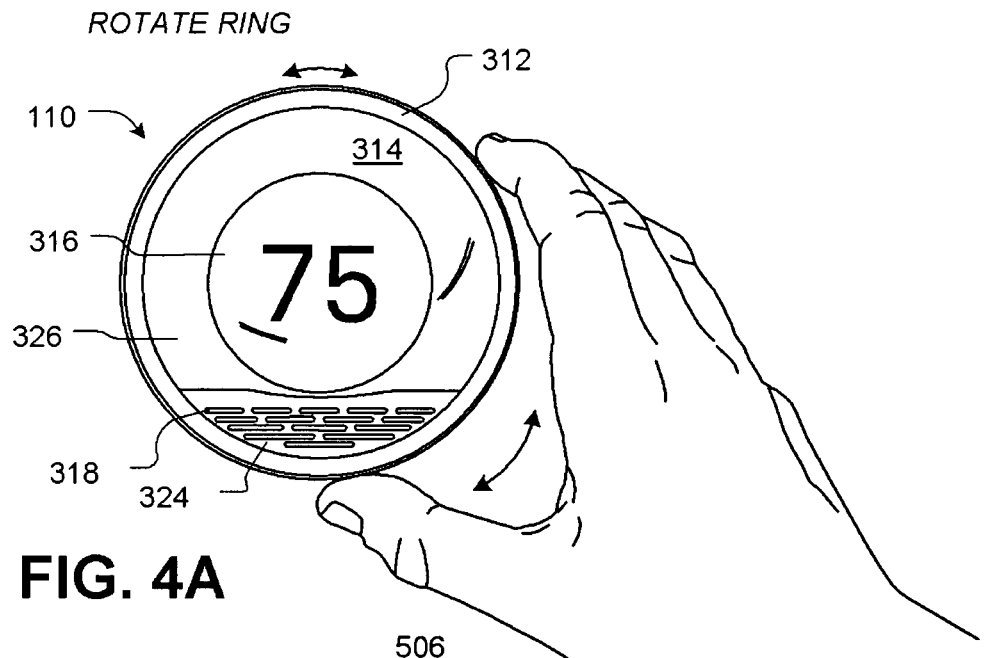
FIGS. 4A-B illustrate a user's hand controlling a thermostat designed in accordance with implementations of the present invention.
Figure 4B:
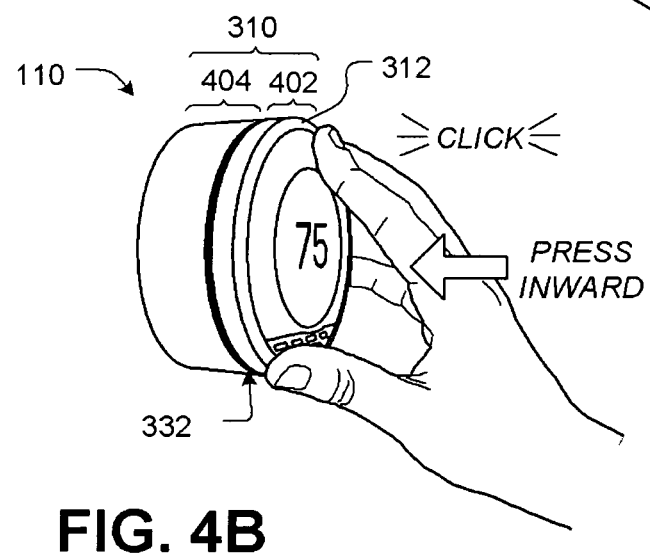

FIGS. 4A-B illustrate a user's hand controlling a thermostat designed in accordance with implementations of the present invention. As illustrated, thermostat 110 is wall-mounted, circular in shape and has a rotatable outer ring 312 for receiving user input. Cover 314 on thermostat 110 includes central display area 316 for providing information and feedback to the user before, during and after operating thermostat 110. In some implementations, outer area 326 of cover 314 delineates an area for the user to push or otherwise manipulate thermostat 110 and thus is made opaque with paint or smoke finish. In accordance with the present invention, grille member 324 provides an additional area that the user may rest their hand while viewing or operating thermostat 110. It can be appreciated that grille member 324 protects sensors from the user's hand yet allows the sensors to receive signals and gather information on the environment.

Head unit 310 of thermostat 110 slides on to backplate (not shown) and further includes head unit front 402 and head unit frame 404. The head unit front 402 includes outer ring 312, central display area 316 and outer area 326 of cover 314 and grille member 324 designed in accordance with implementations of the present invention. A portion of the electronics and sensors (not shown) in thermostat 110 are also included within head unit front 402.

According to some implementations, for the combined purposes of inspiring user confidence and further promoting visual and functional elegance, the thermostat 110 is controlled by only two types of user input, the first being a rotation of the outer ring 312 as illustrated in FIG. 4A (also referred to as a "rotate ring"), and the second being an inward push on the head unit front 402 until an audible and/or tactile "click" occurs as illustrated in FIG. 4B. According to some implementations, the inward push illustrated in FIG. 4B only causes the outer ring 312 to move forward, while in other implementations the entire head unit front 402 moves inwardly together when pushed. In some implementations, cover 314 and grille member 324 do not rotate with outer ring 312.

According to some implementations, multiple types of user input may be generated depending on the way a pushing inward of head unit front 402 is effectuated. In some implementations a single brief push inward of head unit front 402 until the audible and/or tactile click occurs followed by a release (single click) can be interpreted as one type of user input (also referred to as an "inward click"). In other implementations, pushing the head unit front 402 in and holding with an the inward pressure for an amount of time such as 1-3 seconds can be interpreted as another type of user input (also referred to as a "press and hold"). According to some further implementations, other types of user input can be effectuated by a user such as double and/or multiple clicks, and pressing and holding for longer and/or shorter periods of time. According to other implementations, speed-sensitive or acceleration-sensitive rotational inputs may also be implemented to create further types of user inputs (e.g., a very large and fast leftward rotation specifies an "Away" occupancy state, while a very large and fast rightward rotation specifies an "Occupied" occupancy state).

Figure 5A:
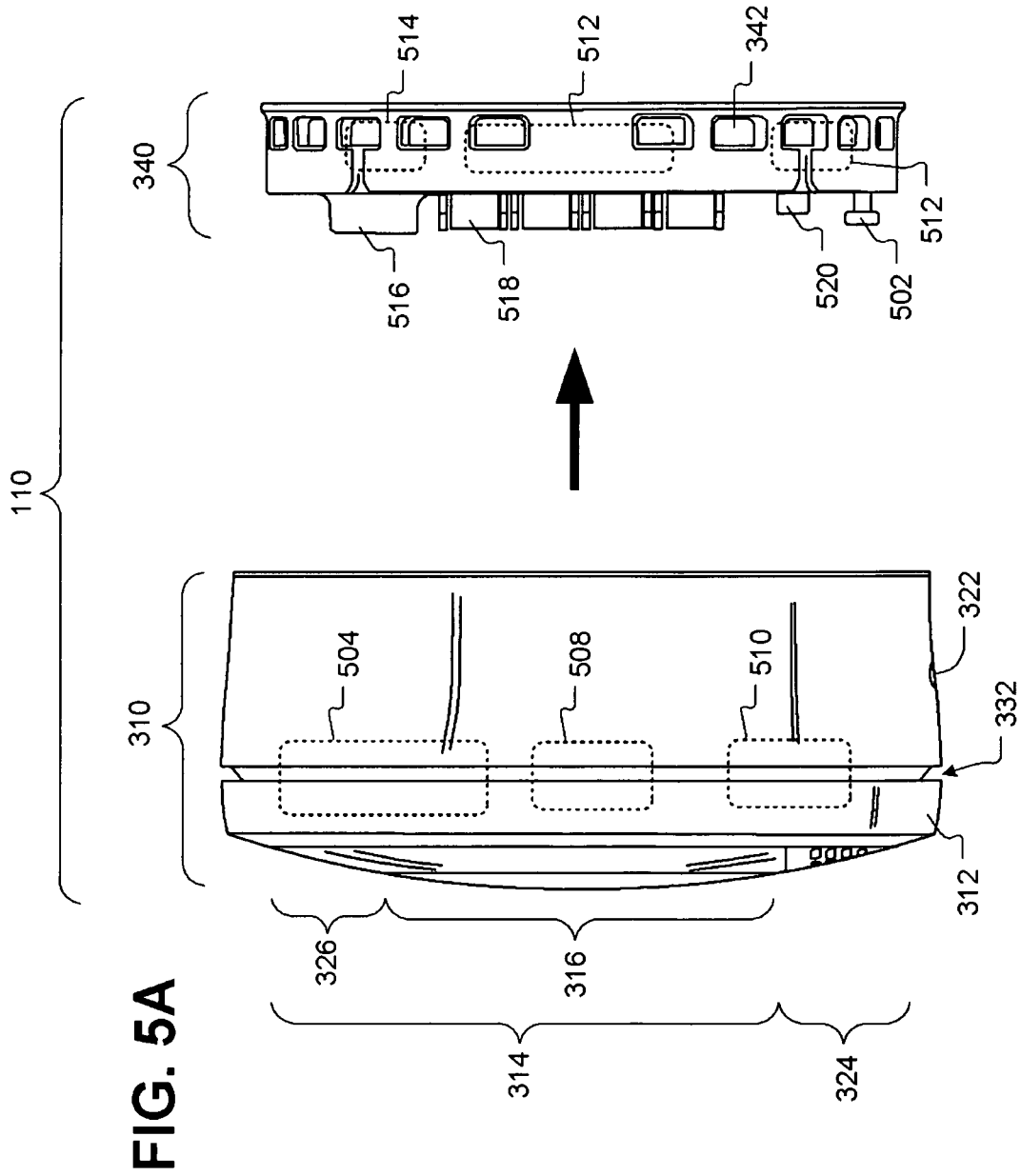

FIGS. 5A-5G illustrate a thermostat in various states of disassembly and the position of grille member 324 designed in accordance with the present invention as it relates to sensors and other components. The disassembled view of thermostat 110 in FIG. 5A illustrates head unit 310 slidably removed from backplate 340. In this configuration, it can be appreciated that backplate 340 can function as a wall dock to the balance of the thermostat 110 contained in head unit 310 thereby contributing to ease of installation, configuration and upgrading, according to some implementations. For example, in such implementations a new, upgraded or refurbished head unit 310 may be placed over an existing backplate 340 without requiring rewiring or remounting of thermostat 110 on the wall.

As previously illustrated and described, thermostat 110 is wall mounted having a circular shape and rotatable ring 312 for receiving user input. Thermostat 110 has a cover 314 that includes a central display area 316 and outer area 326. Head unit 310 portion of thermostat 110 slides onto and is affixed to back plate 340. According to some implementations the connection of the head unit 310 to backplate 340 can be accomplished using magnets, bayonet, latches and catches, tabs or ribs with matching indentations, or simply friction on mating portions of the head unit 310 and backplate 340.

According to some implementations, a locking mechanism is optionally provided wherein a post 502 on the backplate 340 is engaged by a quarter turn of a latch using a flat head screw head or other type of screw heads connected with the latch. For example, a less common type of screw head such as a hex or torx may be used to provide greater security and deter removal of head unit 310 when thermostat 110 is installed in public locations. According to some implementations, the head unit 310 includes a processing system 504, display driver 508 and a wireless communications system 510. The processing system 504 is adapted to cause the display driver 508 and central display area 316 to display information to the user, and to receiver user input via the rotating ring 312. The processing system 504, according to some implementations, is capable of maintaining and updating a thermodynamic model for the enclosure in which the HVAC system is installed. For further detail on the thermodynamic modeling, see U.S. patent application Ser. No. 12/881,463 filed Sep. 14, 2010, which is incorporated by reference herein. According to some implementations, the wireless communications system 510 is used to communicate with a combination of devices such as personal computers, other thermostats or remote devices and/or HVAC system components.

Electronics 512 and temperature sensor 514 are ventilated via vents 342 in backplate 340. A bubble level 516 is provided to aid in correctly orienting the thermostat 110 when it is mounting on a wall. Wire connectors 518 are provided to allow for connection to HVAC system wires. Connection terminal 520 provides electrical connections between the head unit 310 and backplate 340.

Figure 5B:
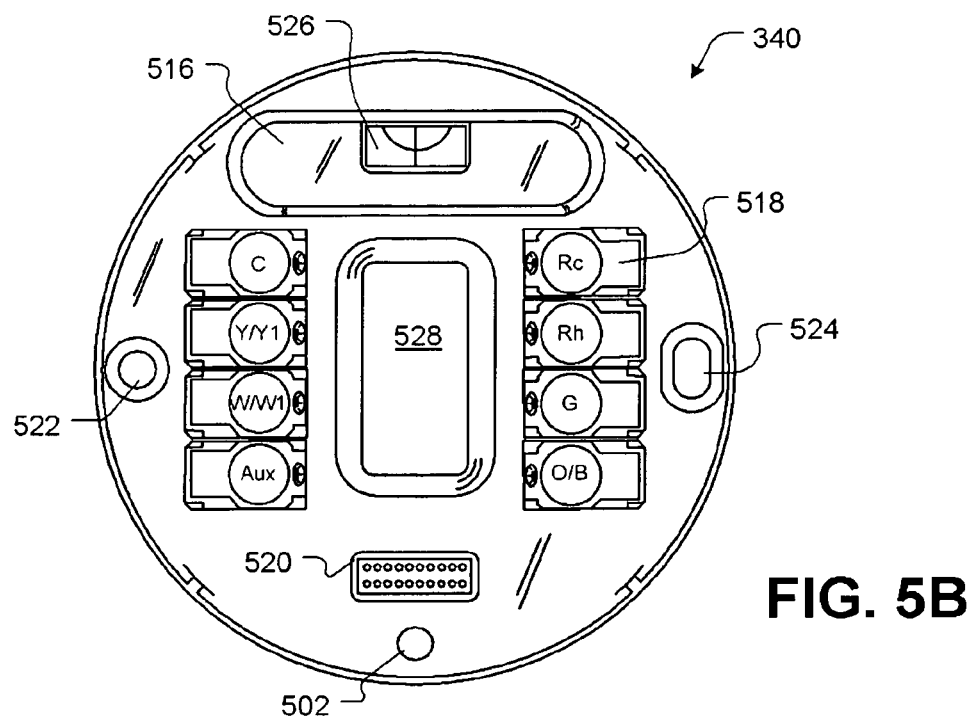
Figure 5C:
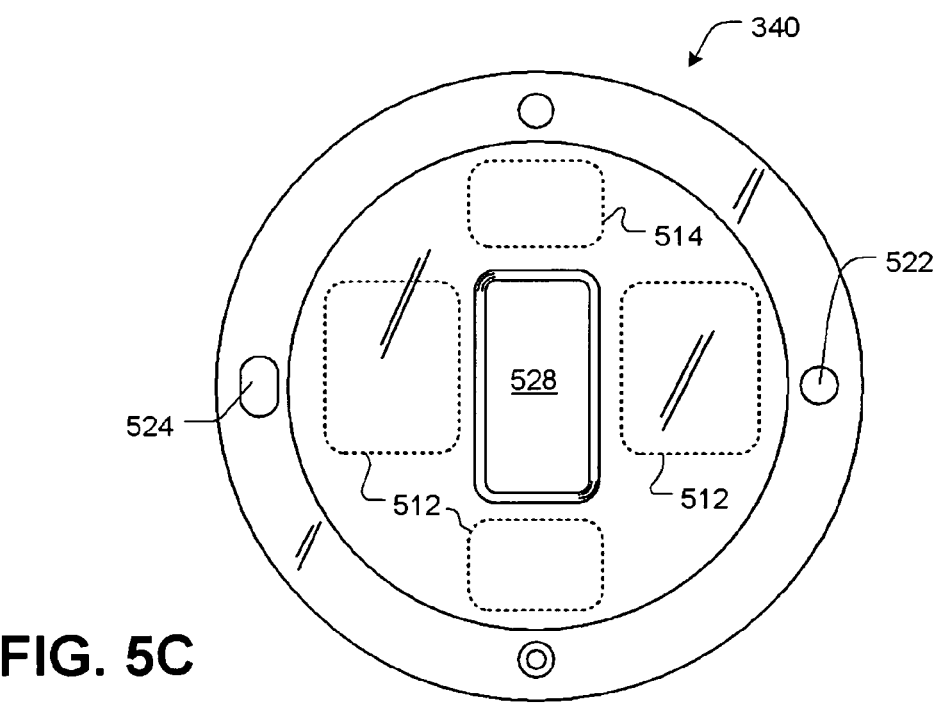

FIGS. 5B-C illustrate a top and bottom view of a thermostat backplate in accordance with implementations of the present invention. The backplate 340 is mounted on a wall using screws through two openings: round hole 522 and slotted hole 524. By using a slotted hole 524, the user or installer can make small adjustments in the angle of mounting of backplate 340. As shown in FIG. 5B, backplate 340 includes bubble level 516 including a window 526 through which the user can check and make a level mounting of backplate 340 on a wall. The HVAC system wires pass through a large rectangular opening 528 and are connected to wire connectors 518. According to some implementations, eight wire connectors are provided as shown in FIG. 5B, and labeled with common HVAC system wire names.

FIG. 5C illustrates the backside of backplate 340 facing the wall when thermostat 110 is wall mounted. In one implementation, a temperature sensor 514 (which, generally speaking, can be of coarser precision in comparison to the head unit temperature sensor 334, although the scope of the present teachings is not so limited) included in backplate 340 which allows the backplate 340 to operate as a functioning thermostat even when the head unit 310 has been removed. For example, the electronics 512 in backplate 340 includes a microcontroller (MCU) processor, and driver circuitry for opening and closing the HVAC control circuits. For example, these control circuits can be used for turning on and turning off the one or more HVAC functions such as heating and cooling. The electronics 512 also includes flash memory which is used to store the series of programmed settings that take effect at different times of the day. For example, a default set of programmed set point changes in flash memory may be carried out even when the head unit 310 in FIG. 5A is not attached to the backplate 340. According to some implementations, the electronics 512 also includes power harvesting circuitry so as to obtain power from the HVAC control circuit(s) even when an HVAC common power wire is not available.

FIGS. 5D-5E illustrates a perspective view of the head unit 310 portion of the thermostat 110 assembled as a single component and disassembled into multiple subcomponents. In the assembled single component illustrated in FIG. 5D, head unit 310 includes a head unit front 402 and head unit frame 404. Head unit 310 in FIG. 5D is conveniently designed to be separated from backplate (not shown) and facilitates easy repair, replacement or upgrades to the electronics, firmware and software in the head unit 310. For example, the thermostat may be upgraded by removing head unit 310 from the backplate and replacing with an upgraded or new head unit 310.

As illustrated in FIG. 5E, head unit front 402 may further be disassembled into grille member 324, cover 314, head unit frontal assembly 530 and outer ring 312. Head unit frontal assembly 530 is slidably mounted and secured to head unit frame 404 urging outer ring 312 to be held between the head unit frontal assembly 530 and head unit frame 404. In some implementations, outer ring 312 is rotatable and receives user inputs through clockwise or counterclockwise rotations while head unit frontal assembly 530 remains fixed in position.

Cover 314 fits over and protects display module 532, which is used to display information to a user viewing the thermostat. As an example, information displayed by display module 532 may include a current temperature such as a temperature of 75 degrees displayed by display module 532 in the central display area 316 in FIG. 3A. In other implementations, display module 532 may also display a variety of other information to the user including setpoints, configuration information, diagnostics and thermostat programming details. Display module 532 in accordance with some implementations is a dot-matrix layout (individually addressable) such that arbitrary shapes can be generated, rather than being a segmented layout. According to other implementations, a combination of dot-matrix layout and a segmented layout may also be employed by display module 532.

Display module 532 may be implemented in accordance with the present invention using a back-lit color liquid crystal display (LCD). According to other implementations, display module 532 may use display technologies such as passive and/or monochrome LCD, organic light-emitting diode (OLED), or electronic ink (e-ink) display technology. E-ink is a particularly well suited display technology for some implementations as it continues to reflect light while not drawing power and energy. Additionally, E-ink display technology implemented in accordance with the present invention also conserves energy as it does not require a particularly short refresh time.

Grille member 324 may be used to conceal and protect a number of different sensors in accordance with the present invention. In some implementations, these sensors may include a temperature sensor 334 and PIR motion sensor 330 sensor integrated with the thermostat. In the implementation illustrated in FIG. 5E, PIR motion sensor 330 includes a Fresnel lens 534 to help direct infrared radiation onto the infrared sensitive elements (not shown in FIG. 5E) of the PIR motion sensor 330. Grille member 324 acts as a cover yet passes a substantial amount of infrared radiation through Fresnel lens 534 and onto the infrared sensitive elements. As will be described in detail later herein, the design of grille member 324 allows PIR motion sensor 330 to detect occupants movement across a wide range of angles in the vicinity of the thermostat even when covered by grille member 324.

Likewise, grille member 324 may also conceal temperature sensor 334 situated near the bottom of edge of Fresnel lens 534 as indicated in FIG. 5E. The grille member 324 helps protect the temperature sensor 334 from being damaged and contributes to the overall streamlined appeal of the thermostat. Additionally, constructing grille member 324 from a heat conducting material, such as metal or a metallic alloy, helps absorb the ambient heat in the vicinity of the thermostat and deliver to temperature sensor 334 for a more accurate measurement.

FIGS. 5F-5G illustrates a perspective view of the head unit frontal assembly 530 appearing as one assembled component and disassembled into multiple subcomponents. In some implementations, head unit frontal assembly 530 includes at least three subcomponents: a display module 532, a head unit front plate 536 and head unit circuit board 538. Display module 532 serves to display information to a user and may be separated from head unit front plate 536 as illustrated.

In accordance with some implementations, head unit front plate 536 is disposed to receive temperature sensor 334 in a temperature sensor slot 540. The temperature sensor 334 is affixed to, and extends approximately normal to the planar surface of head unit circuit board 538. In contrast, PIR motion sensor 330 is coplanar with the surface of head unit circuit board 538 and thus also normal to the temperature sensor 334. When head unit circuit board 538 is slidably mounted to the backside of head unit front plate 536, temperature sensor 334 is urged along the normal to head unit circuit board 538 and inserted into temperature sensor slot 540. Likewise, slidably mounting head unit circuit board 538 into the backside of head unit front plate 536 situates the infrared sensitive elements 331 behind Fresnel lens 534 and making up PIR motion sensor 330 as previously illustrated in FIG. 5E and FIG. 3A.

Figure 6:
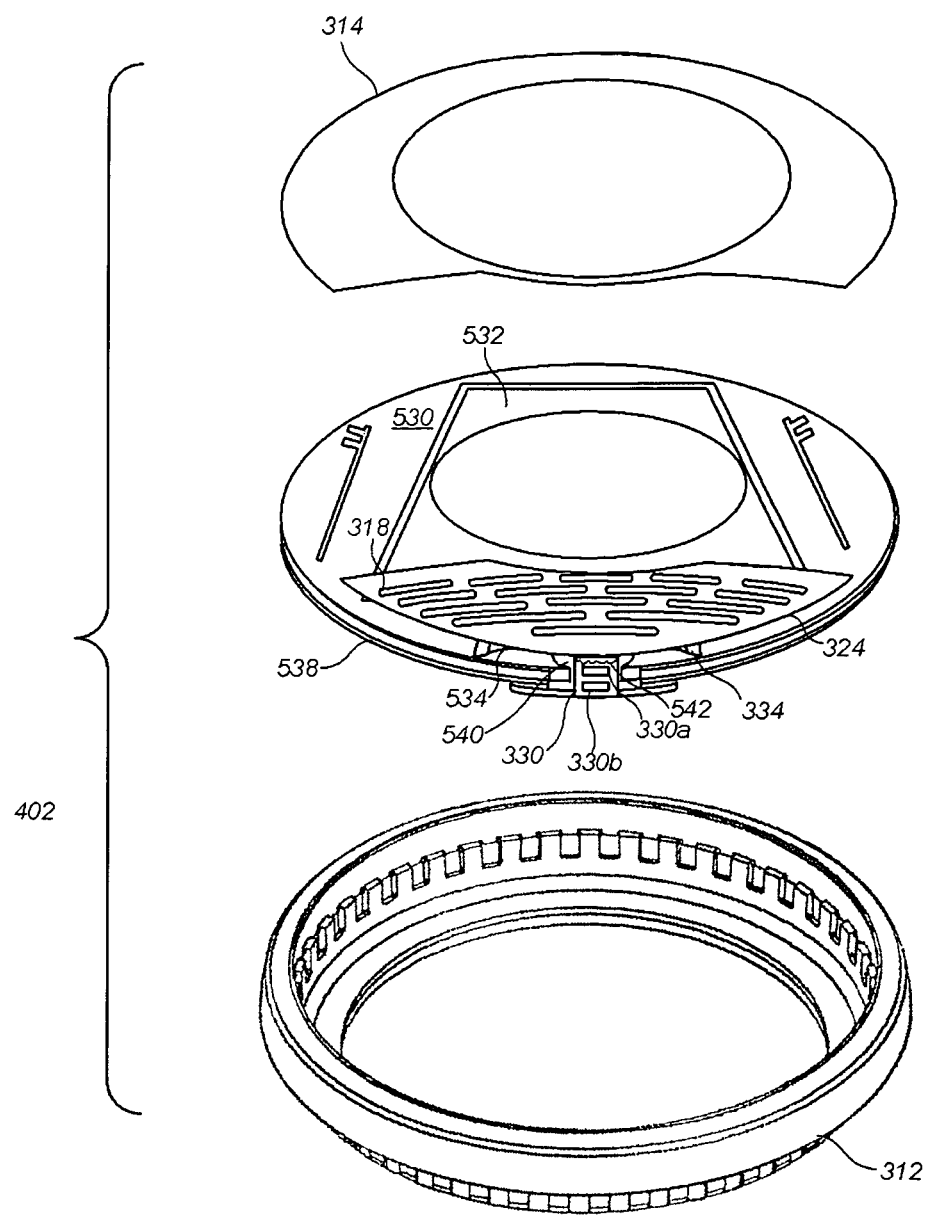
FIG. 6 illustrates a perspective view of partially assembled head unit front from the thermostat showing the positioning of sensors in relation to the grille member designed in accordance with aspects of the present invention.

Perspective view of partially assembled head unit front 402 in FIG. 6 shows the positioning of grille member 324 designed in accordance with aspects of the present invention with respect to several sensors used by the thermostat. In some implementations, head unit front 402 as illustrated in FIG. 6 includes the outer ring 312, grille member 324 positioned on head unit front assembly 530 with cover 314 removed as illustrated. Head unit front 402 makes up a portion of head unit 310 and housing 346 illustrated in FIG. 3B, which is used to enclose the thermostat.

In some implementations, grille member 324 covers one or more sensors used by the thermostat and is attached to a forward-facing surface of the housing by way of the head unit front assembly 530. The design and position of grille member 324 creates a smooth, sleek and visually pleasing impression to users while also serving to improve the durability and function of the one or more sensors it conceals. In some implementations, benefits from grille member 324 may be attributed to a shape of openings 318, the materials used to make grille member 324 or a positioning of grille member 324 with respect to one or more sensors, as well as combinations thereof.

In some implementations, placement of grille member 324 over PIR motion sensor 334 as illustrated in FIG. 6 conceals and protects the sensor. For example, grille member 324 may protect PIR motion sensor 334 during manufacture, shipping, installation or use from a user's hands operating the thermostat as illustrated in FIGS. 4A and 4B. Concealment not only protects the PIR motion sensor 334 but also promotes visually pleasing thermostat suitable for use in a variety of residential and commercial applications.

In accordance with implementations of the present invention, one or more openings 318 in the grille member 324 design allow the PIR motion sensor 334, despite being concealed, to detect the lateral motion of occupants in a room or area. Positioning PIR motion sensor 334 along the forward-facing surface of head unit front assembly 530 allows the sensor's radiation receiving elements to continue to detect the infrared radiation emitted by these occupants in the vicinity of the thermostat. As described in further detail later herein, PIR motion sensor 334 may detect occupants moving laterally due to the shape of openings 318, which are slit-like and elongated along a substantially horizontal direction. In some implementations, the Fresnel lens 534 helps focus the radiation from these occupants onto the infrared sensitive sensor elements (not shown in FIG. 6) of the PIR motion sensor 334. For example, the grille member 324 has one or more openings placed over the radiation receiving elements and Fresnel lens 534 of the PIR motion sensor 334. While grille member 324 may be constructed from a variety of materials including metal, plastic, glass, carbon-composite, and metallic alloy, it is generally preferable for purposes of increased temperature sensing precision for the grille member to be made of a material with a high thermal conductivity, such as a metal or metallic alloy.

Grille member 324 may also enhance the operation of sensors in the thermostat. In some implementations, temperature sensor 334 is not only protected but the detection of ambient temperatures is enhanced by placement of grille member 324. For example, where grille member 324 is made from a thermally conductive material such as a metal or metallic alloy, it operates as a "thermal antenna" and absorbs ambient temperature from a broader area than temperature sensor 334 could otherwise sample. Temperature sensor 334 positioned substantially normal to head unit circuit board 538 towards grille member 324 may be close enough to receive heat absorbed by grille member 324.

In some implementations, applying a thermally conductive materials 542, such as a paste, thermal adhesive or thermal grease between temperature sensor 334 and inward facing surface of grille member 324 improves the thermal conductivity between these two components and the accuracy of the temperature measurement. Thermally coupling grille member 324 with temperature sensor 334 assists temperature sensor 334 to measure the ambient air temperature outside rather than inside of the housing holding the thermostat.

Some implementations of temperature sensor 330 may use a pair of thermal sensors to more accurately measure ambient temperature. A first or upper thermal sensor 330a associated with temperature sensor 330 tends to gather temperature data closer to the area outside or on the exterior of the thermostat while a second or lower thermal sensor 330b tends to collect temperature data more closely associated with the interior of the housing. In one implementation, the Digital Dual Element Pyroelectric Detector Model PYD-1998 from by Excelitas Corp. of Waltham, Mass. (www.excelitas.com) may be used to provide the pair of thermal sensors used by temperature sensor 330. To more accurately determine the ambient temperature, the temperature taken from the lower thermal sensor 330b is taken into consideration in view of the temperatures measured by the upper thermal sensor 330a and when determining the effective ambient temperature. This configuration can advantageously be used to compensate for the effects of internal heat produced in the thermostat by the microprocessor(s) and/or other electronic components therein, thereby obviating or minimizing temperature measurement errors that might otherwise be suffered. In some implementations, the accuracy of the ambient temperature measurement may be further enhanced by thermally coupling upper thermal sensor 330a of temperature sensor 330 to grille member 324 as the upper thermal sensor 330a better reflects the ambient temperature than lower thermal sensor 334b. Details on using a pair of thermal sensors to determine an effective ambient temperature is disclosed in U.S. Pat. No. 4,741,476 issued May 3, 1988 entitled, "Digital Electronic Thermostat With Correction for Triac Self Heating", by Russo et al. incorporated by reference herein for all purposes.

With exemplary reference to FIGS. 5F-5G and FIG. 6, the mutual positioning and configuration of the grille member 324, Fresnel lens 534, PIR sensor 330, upper thermal sensor 330a, and lower thermal sensor 330b provides for an advantageous and synergistic combination of physical compactness and visual sensor concealment, along with promoting ambient temperature sensor accuracy and preserving PIR occupancy sensing functionality. In some ways this can be seen as one beneficial outcome of a "dual use" of a key volume of space lying between the Fresnel lens 534 and the surface of the PIR sensor 334, wherein the necessary spacing between the Fresnel lens 534 and the surface of the PIR sensor 334 also serves as the space across which a temperature gradient between the lower thermal sensor 330b and upper thermal sensor 330a is formed and sensed, this temperature gradient being leveraged to provide better ambient temperature sensing than would be provided by a single-point thermal sensor. In turn, the compactness promoted by the configuration of elements 534/334/330a/330b allows them to be placed behind the grille 324 without the necessity of substantially enlarging the outward protrusion of the overall housing. At the same time, for preferred implementations in which the grille member 324 is metallic and thermally coupled to the upper thermal sensor 330a, the high thermal conductivity of the grille member 324 still further enhances the accuracy of temperature measurement by acting as a "thermal antenna," which is in addition to its other functions of concealment and ambient air access.

FIG. 7A-7B illustrates in detail how infrared sources interact with slit-like openings in a grille member designed in accordance with the present invention. To highlight the interactions, FIG. 7A illustrates grille member 324 with openings 318 and PIR motion sensor 330 positioned behind grille member 324 as it would be in a thermostat designed in accordance with the present invention. In accordance with some implementations, openings 318 are slit-like along a substantially horizontal direction as illustrated. Infrared sources may sweep across a continuous wide range of angles such as by the lateral movement an occupant walking across a room or other area. To represented this range, FIG. 7A has arrows representing a left infrared source 702, a center infrared source 706 and a right infrared source 704. For example, an occupant walking across a room in front of a thermostat with grille member 324 may first emit radiation appearing as a left infrared source 702 then gradually a center infrared source 706 and then gradually a right infrared source 704.

As FIG. 7A shows schematically, the slit-like openings 318 of grille member 324 allow a wide range of infrared sources to pass through towards PIR motion sensor 330. Both left infrared source 702 and right infrared source 704 may pass along the elongated horizontal openings 318 as indicated by the arrows of these sources. Center infrared source 706 also passes through openings 318 in grille member 324 as allowed by the vertical height of one or more of the elongated slits. It therefore can also be appreciated that the openings 318 from grille member 324 having a slit-like shape allow the PIR motion sensor 330 to detect the radiation emitted by an occupant moving laterally across a wide-range of angles near the thermostat. For example, grille member 324 can detect an occupant moving on the left side of grille member 324 as a left infrared source 702 or on the right side of grille member 324 as a right infrared source 704. A person moving approximately in the center of grille member 324 would appear as a center infrared source 706 and also pass through openings 318 towards PIR motion sensor 330. Indeed, grille member 324 would also pass many other infrared sources at angles between left infrared source 702, center infrared source 706 and right infrared source 704 through openings 318 towards PIR motion sensor 330.

FIG. 7B illustrates the effect of an occupant moving past a PIR motion sensor in a thermostat covered by a grille member of the present invention. The PIR motion sensor (not shown in FIG. 7B) sits behind grille member 324 much like PIR motion sensor 330 in FIG. 7A. The PIR motion sensor is capable of detecting a lateral change of radiation 710 caused by a laterally moving source of infrared radiation such as a person walking in a room. To make the occupancy detector work properly, these lateral changes in radiation 710 caused by the occupant must be distinguished from overall changes in the infrared radiation caused by sunlight and ambient heat sometimes referred to as the common-mode signal.

In some implementations, the PIR motion sensor has a pair of differential sensing elements setup with opposing polarity to reject the common-mode signal produced by radiation 710. When occupant 708 is not present or not moving, sudden overall changes in radiation 710 caused by sunlight, heat or vibration produce complimentary signals from the pair of differential sensing elements simultaneously. The complimentary signals from the pair of differential sensing elements immediately cancel out these false-positive or common-mode signals.

In comparison, an occupant 708 moving laterally in the direction of the arrows in FIG. 7B across a room or other space near thermostat 110 creates a local change in radiation 710. The local change in radiation 710 is detected and not canceled out with the common-mode signal portion of radiation 710 as the sensing elements are arranged along a horizontal axis and triggered sequentially, not simultaneously, by the lateral movement. Because openings 318 in grille member 324 are slit-like, radiation 710 enters thermostat 110 and is detected by PIR motion sensor whether the occupant 708 is moving laterally from the far right, far left or laterally near the center area near the thermostat.

FIGS. 8A-8D illustrate altering the openings of a grille member along a vertical distance to change the sensitivity of a PIR motion sensor in accordance with aspects of the present invention. Generally, the PIR motion sensor's sensitivity to the height of occupants can be changed by varying the vertical span of the openings in a grille member. In accordance with some implementations, a grille member 802 illustrated in FIG. 8A is located on a forward-facing surface of the thermostat 810 mounted on a wall. Thermostat 810 is partially shown in FIG. 8B for convenience yet is similar to thermostat 110 described and illustrated in FIG. 3A. Grille member 802 in FIG. 8A has several rows of openings 806, each having a slit-like shape and organized along a vertical span 804. Accordingly, a PIR motion sensor (not shown in FIGS. 8A-8D) behind grille member 802 used with thermostat 810 in FIG. 8B and has an angle of sensitivity 808 or $\theta_1$. If an occupant's height is within the angle of sensitivity 808 then the PIR motion sensor in thermostat 810 in FIG. 8B should be able to detect the radiation emitted from the occupant's lateral movement. Conversely, an occupant whose height falls below the angle of sensitivity 808, is not likely to be detected by the PIR motion sensor in thermostat 810 in FIG. 8B.

In accordance with an alternate implementation, sensitivity to height may be decreased as illustrated in FIG. 8C by reducing the number of rows or openings across the vertical span. Compared with grille member 802, the number of rows of openings 816 in grille member 812 illustrated in FIG. 8C are fewer in number than the rows of openings 806. Moreover, openings 816 in grille member 812 are spread over a vertical span 814 that is both narrower and positioned higher than vertical span 804 in grille member 802. Consequently, using grille member 812 in thermostat 810 in FIG. 8D results in a narrower angle of sensitivity 818 or $\theta_2$ compared with the angle of sensitivity 808 or $\theta_1$ previously described. For example, a PIR motion sensor behind grille member 812 on thermostat 810 in FIG. 8D will not detect occupants whose height is outside the angle of sensitivity 818 or $\theta_2$. As a result, the same occupants detected by thermostat 810 with grille member 802 might not be tall enough to be detected by thermostat 810 using grille member 812. Depending on the installation, it may be more desirable to use a grille member more like grille member 812 in order to limit detection of occupants that are taller in height. To detect occupants that may be shorter in height, use of grille member 802 in thermostat 810 may be more desirable.

Since FIGS. 8A-8D are meant to be illustrative, the shape, number, size, organization and location of openings in grille member 802 and 812 are but exemplary and used for comparison purposes. Indeed, the designs of grille members of the present invention should not be limited by specific sizes, number of openings, specific shapes or the absolute or relative positions of these or other features.

In some implementations, different grille members may be manufactured with a different number of openings having slit-like dimensions arranged in one or more rows. For example, a person installing thermostat 810 may select and install different grille members depending on the desired sensitivity to the heights of the occupants and the location of the thermostat 810 on a wall or other location. In other implementations, the installer may use a mask member attached to the back openings in the grille member to modify the openings and adjust the sensitivity to height. Instead of manufacturing different grille members, one grille member can be altered using the mask member to cover or uncover the desired number of openings in the grille member. For example, the mask member may be plastic or metal fittings with slit-like dimensions applied to the backside of grille member 802 that fill one or more of openings 806. These fittings of the mask member may be finished in the same tone or color as the surface of grille member 802 in order to blend into the overall appearance of the grille member 802. Accordingly, the sensitivity to the height of occupants may be varied depending on the coverage by the mask member of the substantially horizontal slit-like openings used to pass the emitted radiation to the receiving surface of the PIR motion sensor.

Figure 9:
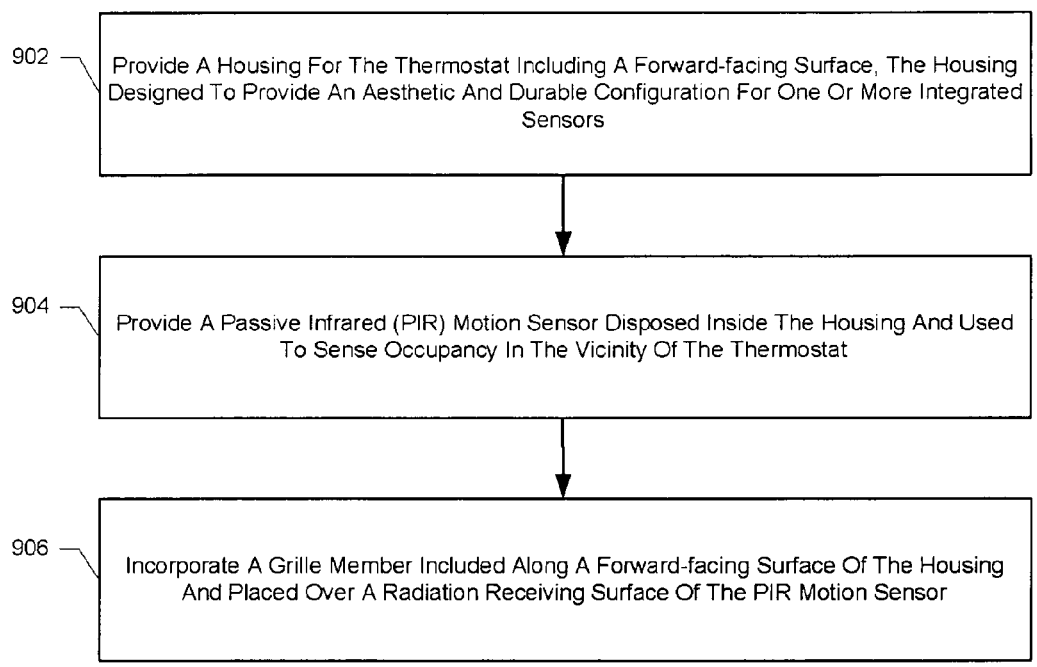
FIG. 9 is flow chart diagram that outlines the operations associated with integrating sensor capabilities with a thermostat and grille member in accordance with aspects of the present invention.

Referring to FIG. 9, a flow chart diagram outlines the operations associated with integrating sensor capabilities with a thermostat and grille member in accordance with aspects of the present invention. In some implementations, the integration operations include providing a housing for the thermostat designed to provide an attractive and durable configuration for one or more integrated sensors (902). Housing for the thermostat may be housing 346 and thermostat 110 illustrated in FIG. 3B as previously described. The thermostat is enclosed by the housing with a forward-facing surface for a cover and grille member in accordance with aspects of the present invention. The one or more integrated sensors protected by the housing may include an occupancy sensor such as a PIR motion detector, a temperature sensor, a humidity sensor, a proximity sensor or other sensors that might be useful in operating a thermostat. Placing these and other sensors inside the housing protects them from being accidentally jarred or broken during manufacture, shipping, installation or use. Because sensors are protected inside the housing, they are more likely to retain their calibration and provide accurate measurement results for the thermostat.

Additionally, the integration operations may also provide a passive infrared (PIR) motion sensor disposed inside the housing and used to sense occupancy in the vicinity of the thermostat (904). In some implementations, the PIR motion sensor has a radiation receiving surface able to detect the radiation emitted towards the forward-facing surface of the housing by the lateral movement of a nearby occupant. Occupancy information detected by the PIR motion sensor may be used by the thermostat to better adjust heating or cooling operations of an HVAC in an enclosure such as a residential house. In some implementations, a thermostat may use the occupancy information to turn the HVAC on when occupancy is detected and off when no occupancy is detected by the PIR motion sensor. In alternate implementations, the thermostat may use the occupancy information generated by the PIR motion sensor as part of a heuristic that learns when an enclosure is likely to be occupied or unoccupied and anticipates the heating or cooling requirements. This heuristic may use real-time and historic geographic weather trends and other factors combined with learned occupancy patterns to determine when the enclosure needs cooling or heating. A temperature sensor disposed inside the housing may also be provided to detect the ambient temperature in the vicinity of the thermostat. The PIR motion sensor and temperature sensor may be similar to PIR motion sensor 330 and temperature sensor 334 respectively illustrated in FIG. 6 as previously described.

Integration operations in accordance with the present invention may further attach a grille member along a forward-facing surface of the housing and placed over the radiation receiving surface of the PIR motion sensor (906). As previously described, the grille member may substantially conceal and protects the PIR motion sensor disposed inside the housing. Concealing the PIR motion sensor promotes a visually pleasing quality of the thermostat as well as protects the PIR motion sensor during manufacture, shipment, installation and use. In some implementations, the grille member may be similar to grille member 324 previously described and illustrated in accordance with FIG. 3A. Accordingly, the grille member may be manufactured from one or more materials selected from a set of materials including: metal, plastic, glass, carbon-composite, metallic-carbon composite and metallic alloy. The grille member may be a thermally conductive material such as a metal or metal alloy and may be thermally coupled to the temperature sensor also disposed inside the housing of the thermostat. In some implementations, thermally coupling the temperature sensor to the grille member assists with the temperature sensors ability to measure an ambient temperature of air measured outside of the housing rather than inside of the housing.

While examples and implementations have been described, they should not serve to limit any aspect of the present invention. Accordingly, various modifications may be made without departing from the spirit and scope of the invention. Indeed, while the occupancy sensor positioned behind the grille member is characterized in one or more embodiments supra as being a PIR sensor, for which the above-described configurations are particularly advantageous, the scope of the present teachings is not so limited. Moreover, it is to be appreciated that while the grille member is characterized in one or more embodiments supra as being generally forward-facing, which is useful for more common scenarios in which the thermostat is mounted on a wall at a moderate height above the floor that makes it easy to reach, the scope of the present teachings is not so limited. By way of example, there is provided in some further embodiments a thermostat, comprising a housing including a region of interest-facing surface (ROI-facing surface), where the ROI corresponds to the relevant area or volume of the house (or other enclosure) for which occupancy or occupancy-related events are to be sensed. The thermostat further includes an occupancy sensor disposed inside the housing and used to sense occupancy in the ROI, the occupancy sensor having at least one receiving surface and being able to detect the presence and/or movement of the occupant in the ROI. The thermostat further includes a grille member having one or more openings and included along the ROI-facing surface of the housing and placed over the one or more receiving surfaces of the occupancy sensor that substantially conceals and protects the occupancy sensor disposed inside the housing, whereby the concealment of the occupancy sensor by the grille member promotes a visually pleasing quality of the thermostat yet permits the occupancy sensor to effectively detect the presence and/or movement of the occupant in the ROI. The ROI-facing surface can be a forward-facing surface for a conventional wall-mounted location, or can be a downward-facing surface (including a diagonally-outward downward angle) for a mounting location that is above a doorway, for example, such that persons going in and out of the room are sensed. The occupancy sensor can include, for example, one or more of a PIR sensor, an actively transmitting proximity sensor, an ambient light sensor, and an ultrasound sensor. In the case of a PIR sensor and a mounting location over the doorway, the slotted openings in the grille member can be oriented in a direction normal to the door opening, such that movement toward and away from the door is more optimally sensed. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described implementations, but instead is defined by the appended claims in light of their full scope of equivalents.

What is claimed is:

1. A thermostat, comprising:
a housing including a forward-facing surface;
a passive infrared (PIR) motion sensor disposed inside the housing and used to sense occupancy in the vicinity of the thermostat, the PIR motion sensor having a radiation receiving surface and being able to detect the lateral movement of an occupant in front of said forward-facing surface of said housing;
one or more temperature sensors disposed inside the housing; and
a grille member having one or more elongated features over the radiation receiving surface of the PIR motion sensor, wherein:
at least one temperature sensor is thermally coupled to the grille member,
the grille member occupies a void in the forward-facing surface, and
the grille member substantially conceals and protects both the PIR motion sensor and at least one temperature sensor disposed inside the housing, whereby the concealment of the PIR motion sensor by the grille member promotes a visually pleasing quality of the thermostat yet permits the PIR motion sensor to effectively detect the lateral movement of the occupant.

2. The thermostat of claim 1, wherein said grille member elongated features are slit-like openings oriented along a substantially horizontal direction, said substantially horizontal direction corresponding to the lateral movement of the occupant.

3. The thermostat of claim 1, wherein the grille member is comprised of one or more materials selected from a set of materials including: metal, plastic, glass, carbon-composite, and metallic alloy.

4. The thermostat of claim 3, wherein the at least one temperature sensor is thermally coupled to the grille using a thermally conductive paste applied to the at least one temperature sensor and an inward facing surface of the grille member.

5. The thermostat of claim 1, wherein the grille member facilitates the at least one temperature sensor's ability to measure an ambient temperature of air outside of the housing.

6. The thermostat of claim 1, wherein the grille member is comprised of a material having high thermal conductivity.

7. The thermostat of claim 1, wherein the grille member incorporated in the forward-facing surface of the housing may be used control the PIR motion sensor's sensitivity to the height of occupants by varying a vertical span of one or more elongated features on the grille member that pass the emitted radiation to the receiving surface of the PIR motion sensor.

8. The thermostat of claim 7 wherein the grille member incorporated in the forward-facing surface of the housing may be used control the PIR motion sensor's sensitivity to the height of occupants by changing a number of the elongated features that pass infrared radiation to the receiving surface of the PIR motion sensor.

9. The thermostat of claim 1, wherein the grille member incorporated in the forward-facing surface of the housing further comprises a mask member attached to a back portion of the grille member, wherein the sensitivity to the height of occupants may be varied depending on the coverage by the mask member of the elongated features used to pass the emitted radiation to the receiving surface of the PIR motion sensor.

10. The thermostat of claim 1, wherein at least one of the elongated features has an optical property different from a remainder of the grille member.

11. A method of integrating occupancy sensing capabilities in a thermostat, comprising:
providing a housing for the thermostat including a forward-facing surface;
providing one or more temperature sensors disposed inside the housing;
providing a passive infrared (PIR) motion sensor disposed inside the housing and used to sense occupancy in the vicinity of the thermostat, the PIR motion sensor having a radiation receiving surface and being able to detect the lateral movement of an occupant in front of said forward-facing surface of the housing; and
attaching a cover member to occupy a void in the forward-facing surface of the housing and placed over the radiation receiving surface of the PIR motion sensor, wherein:
at least one temperature sensor is thermally coupled to said cover member,
the cover member substantially conceals and protects both the PIR motion sensor and at least one temperature sensor disposed inside the housing promoting a visually pleasing quality of said thermostat, and
whereby one or more elongated features in the cover member enables the PIR motion sensor to detect lateral movement of an occupant in front of said forward-facing surface of the housing of the thermostat.

12. The method of claim 11, wherein said cover member is comprised of one or more materials selected from a set of materials including: metal, plastic, glass, carbon-composite, metallic-carbon composite and metallic alloy.

13. The method of claim 12 wherein the cover member is comprised of a material having high thermal conductivity.

14. The method of claim 11 wherein said cover member facilitates the at least one temperature sensor's ability to measure an ambient temperature of air measured outside of the housing rather than inside of the housing.

15. The thermostat of claim 11, wherein said at least one temperature sensor is in contact with an inward facing surface of said cover member by a thermally conductive paste.

16. The method of claim 11, wherein the cover member incorporated in the forward-facing surface of the housing may be used control the PIR motion sensor's sensitivity to the height of occupants by varying a number of rows of a plurality of substantially horizontal elongated features that pass infrared radiation to the receiving surface of the PIR motion sensor.

17. The method of claim 11, wherein the cover member incorporated in the forward-facing surface of the housing further comprises a mask member attached to a backside portion of the cover member, wherein the sensitivity to the height of occupants may be varied depending on the coverage by the mask member of a plurality of substantially horizontal elongated features used to pass infrared radiation to the receiving surface of the PIR motion sensor.

18. The method of claim 11, wherein at least one of the elongated features has an optical property different from a remainder of the cover member.

19. A thermostat, comprising:
a housing for said thermostat including a forward-facing surface;
a passive infrared (PIR) motion sensor coplanar with the forward-facing surface of the housing and used to sense occupancy in the vicinity of the thermostat, the PIR motion sensor having Fresnel lens on a surface of the PIR motion sensor that directs infrared radiation towards infrared sensitive sensor elements below the surface of the PIR motion sensor, wherein the infrared sensitive sensor elements detect the infrared radiation emitted towards said forward-facing surface by the lateral movement of an occupant in front of said forward-facing surface of said housing;
a temperature sensor disposed inside the housing and further including an upper thermal sensor and a lower thermal sensor positioned along a plane substantially normal and adjacent to the PIR motion sensor, wherein the upper thermal sensor tends to collect temperature data associated with an area outside the thermostat and the lower thermal sensor tends to collect temperature data associated with an interior of the housing for the thermostat and the temperature data from the lower thermal sensor is taken into consideration in view of the temperature data from the upper thermal sensor in determining an ambient temperature; and
a cover member occupies a void in the forward-facing surface of the housing and is placed over the surface of the PIR motion sensor, wherein:
the cover member has a plurality of elongated features that enable the PIR motion sensor to detect infrared radiation emitted by the lateral movement of the occupant, the cover member is comprised of a thermally conductive material and also placed in close proximity to the temperature sensor and acts as a thermal antenna to at least one thermal sensor associated with the temperature sensor thereby enhancing the ability of the temperature sensor to gather temperature data outside of the housing and detect an ambient temperature of an environment, and the upper thermal is coupled to the cover member with the thermally conductive material.

20. The thermostat of claim 19, wherein the plurality of elongated features of said cover member are positioned along a substantially horizontal direction that facilitates the ability of the PIR motion sensor to detect the lateral movement of an occupant in front of the forward-facing surface of the housing.

21. The thermostat of claim 19, wherein the cover member is comprised of one or more materials selected from a set of materials including: metal, plastic, glass, carbon-composite, and metallic alloy.

22. The thermostat of claim 17, wherein at least one of the plurality of temperature sensors is thermally coupled to the cover using a thermally conductive paste applied to the at least one thermal sensor associated with the temperature sensor along an inward facing surface of the cover member.

23. The thermostat of claim 19, wherein the cover member incorporated in the forward-facing surface of the housing may be used control the PIR motion sensor's sensitivity to the height of occupants by varying a vertical span of one or more openings on the cover member that pass the emitted radiation to the receiving surface of the PIR motion sensor.

24. The thermostat of claim 19 wherein the cover member incorporated in the forward-facing surface of the housing may be used control the PIR motion sensor's sensitivity to the height of occupants by changing a number of rows of the plurality of substantially horizontal elongated features that pass the emitted radiation to the receiving surface of the PIR motion sensor.

25. The thermostat of claim 19, wherein the cover member incorporated in the forward-facing surface of the housing further comprises a mask member attached to a back portion of the cover member, wherein the sensitivity to the height of occupants may be varied depending on a coverage by the mask member of the plurality of substantially horizontal elongated features used to pass the emitted radiation to the receiving surface of the PIR motion sensor.

26. The thermostat of claim 19, wherein at least one of the elongated features has an optical property different from a remainder of the cover member.

* * * * *